US010271339B2

(12) United States Patent
Takeuchi

(10) Patent No.: US 10,271,339 B2
(45) Date of Patent: Apr. 23, 2019

(54) RADIO BASE STATION APPARATUS AND RESOURCE ALLOCATION METHOD

(71) Applicant: NEC CORPORATION, Toko (JP)

(72) Inventor: Toshiki Takeuchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 279 days.

(21) Appl. No.: 15/023,495

(22) PCT Filed: Mar. 14, 2014

(86) PCT No.: PCT/JP2014/056859
§ 371 (c)(1),
(2) Date: Mar. 21, 2016

(87) PCT Pub. No.: WO2015/045444
PCT Pub. Date: Apr. 2, 2015

(65) Prior Publication Data
US 2016/0219602 A1    Jul. 28, 2016

(30) Foreign Application Priority Data

Sep. 26, 2013  (JP) .................................. 2013-199439

(51) Int. Cl.
*H04W 24/00* (2009.01)
*H04W 72/08* (2009.01)
(Continued)

(52) U.S. Cl.
CPC .... *H04W 72/085* (2013.01); *G06F 17/30312* (2013.01); *G06N 5/02* (2013.01);
(Continued)

(58) Field of Classification Search
CPC .... H04W 24/00; H04L 43/50; H04L 43/0852; H04L 43/08; H04B 17/003
See application file for complete search history.

(56) References Cited

U.S. PATENT DOCUMENTS 5,555,444 A * 9/1996 Diekelman ........ H04B 7/18539
455/12.1
6,075,770 A * 6/2000 Chang .................. H04L 49/309
370/252
(Continued)

FOREIGN PATENT DOCUMENTS

JP  2004-282469  10/2004
JP  2004-343309  12/2004
(Continued)

OTHER PUBLICATIONS

International Search Report, PCT/JP2014/056859, dated Apr. 22, 2014.

*Primary Examiner* — Hassan A Phillips
*Assistant Examiner* — Prenell P Jones
(74) *Attorney, Agent, or Firm* — Young & Thompson

(57) ABSTRACT

Traffic history storage unit (130) stores, as traffic history, traffic results at base station cell radio units (200-1 to 200-n). Traffic database (140) stores traffic data learned on the basis of the traffic history. Traffic prediction unit (150) predicts, on the basis of the traffic data and the traffic history, traffic fluctuation that may occur after a predetermined time interval. Process resource control unit (160) controls, on the basis of the predicted traffic fluctuation, the allocation of process resources in signal processing cards (121-1 to 121-m) at every predetermined time intervals.

15 Claims, 17 Drawing Sheets

(51) Int. Cl.
*H04W 28/16* (2009.01)
*G06F 17/30* (2006.01)
*G06N 5/02* (2006.01)
*H04W 24/08* (2009.01)
*H04W 72/04* (2009.01)
*H04W 88/08* (2009.01)

(52) U.S. Cl.
CPC ........... *H04W 24/08* (2013.01); *H04W 28/16* (2013.01); *H04W 72/0446* (2013.01); *H04W 72/04* (2013.01); *H04W 88/08* (2013.01)

(56) References Cited

U.S. PATENT DOCUMENTS

| | | | | |
|---|---|---|---|---|
| 6,411,946 B1* | 6/2002 | Chaudhuri | ........... | G06Q 20/102 705/40 |
| 6,542,739 B1* | 4/2003 | Garner | ............... | H04B 7/18539 455/1 |
| 2003/0231595 A1* | 12/2003 | Zino | ........................ | H04L 45/04 370/238 |
| 2004/0005861 A1* | 1/2004 | Tauchi | ................... | H04B 7/155 455/11.1 |
| 2004/0181370 A1* | 9/2004 | Froehlich | ............... | G06F 9/5083 702/187 |
| 2005/0107123 A1* | 5/2005 | Ishii | ....................... | H04W 24/02 455/560 |
| 2007/0087756 A1* | 4/2007 | Hoffberg | ............ | G06Q 10/0631 455/450 |
| 2010/0075688 A1 | 3/2010 | Watanabe | | |
| 2010/0290413 A1 | 11/2010 | Kuwahara | | |
| 2013/0070625 A1* | 3/2013 | Fujishima | ............. | H04W 36/20 370/252 |
| 2013/0188495 A1* | 7/2013 | Isokangas | ........... | H04W 76/048 370/241 |
| 2014/0328178 A1* | 11/2014 | Haberland | ............ | H04W 28/08 370/235 |

FOREIGN PATENT DOCUMENTS

| | | |
|---|---|---|
| JP | 2010-268192 | 11/2010 |
| JP | 2011-101104 | 5/2011 |
| JP | 2012-085155 | 4/2012 |
| JP | 2013-502182 | 1/2013 |
| WO | WO 2008/149403 | 12/2008 |

* cited by examiner

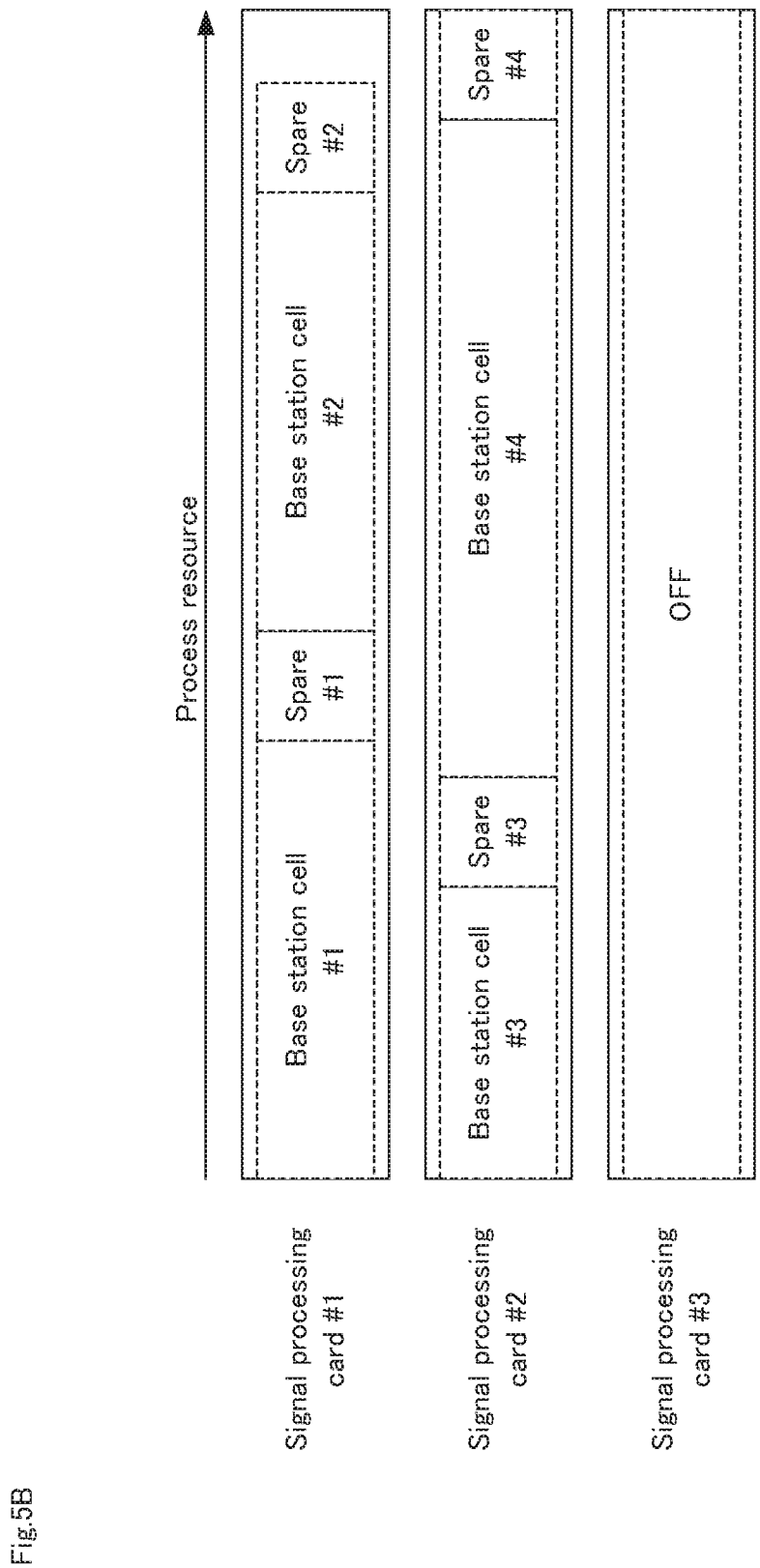

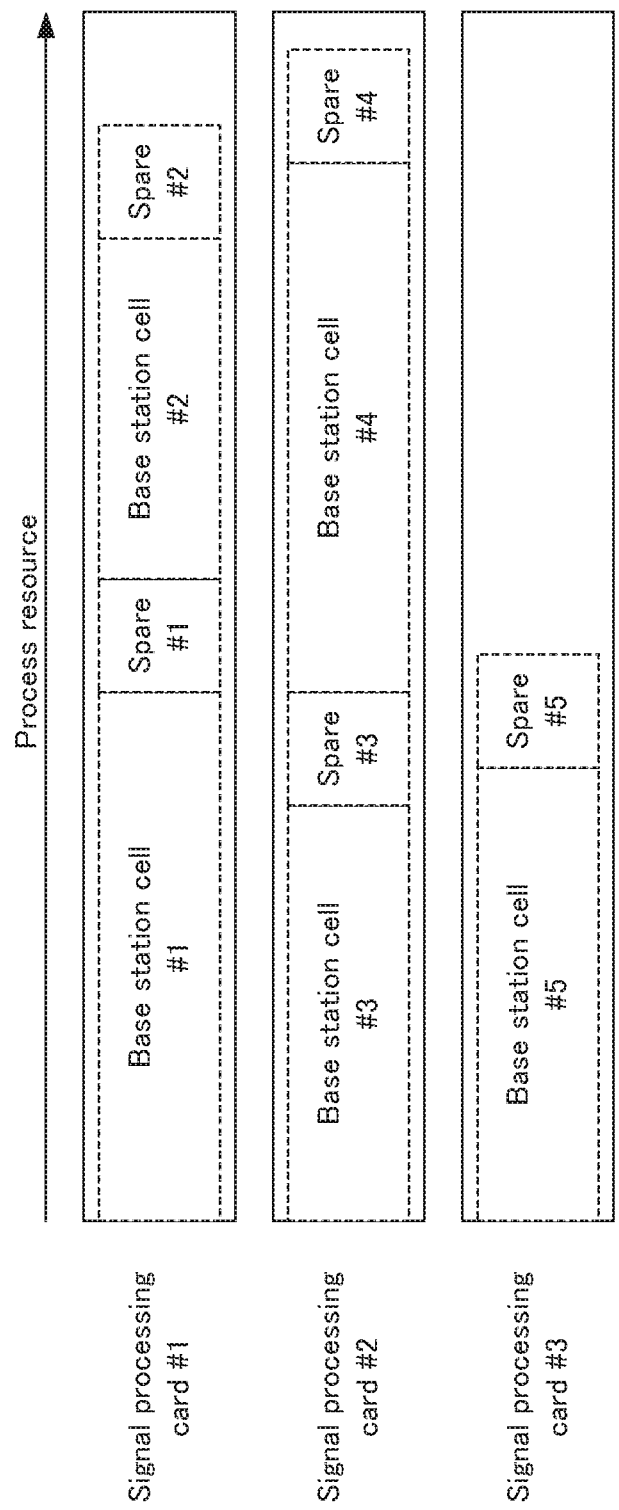

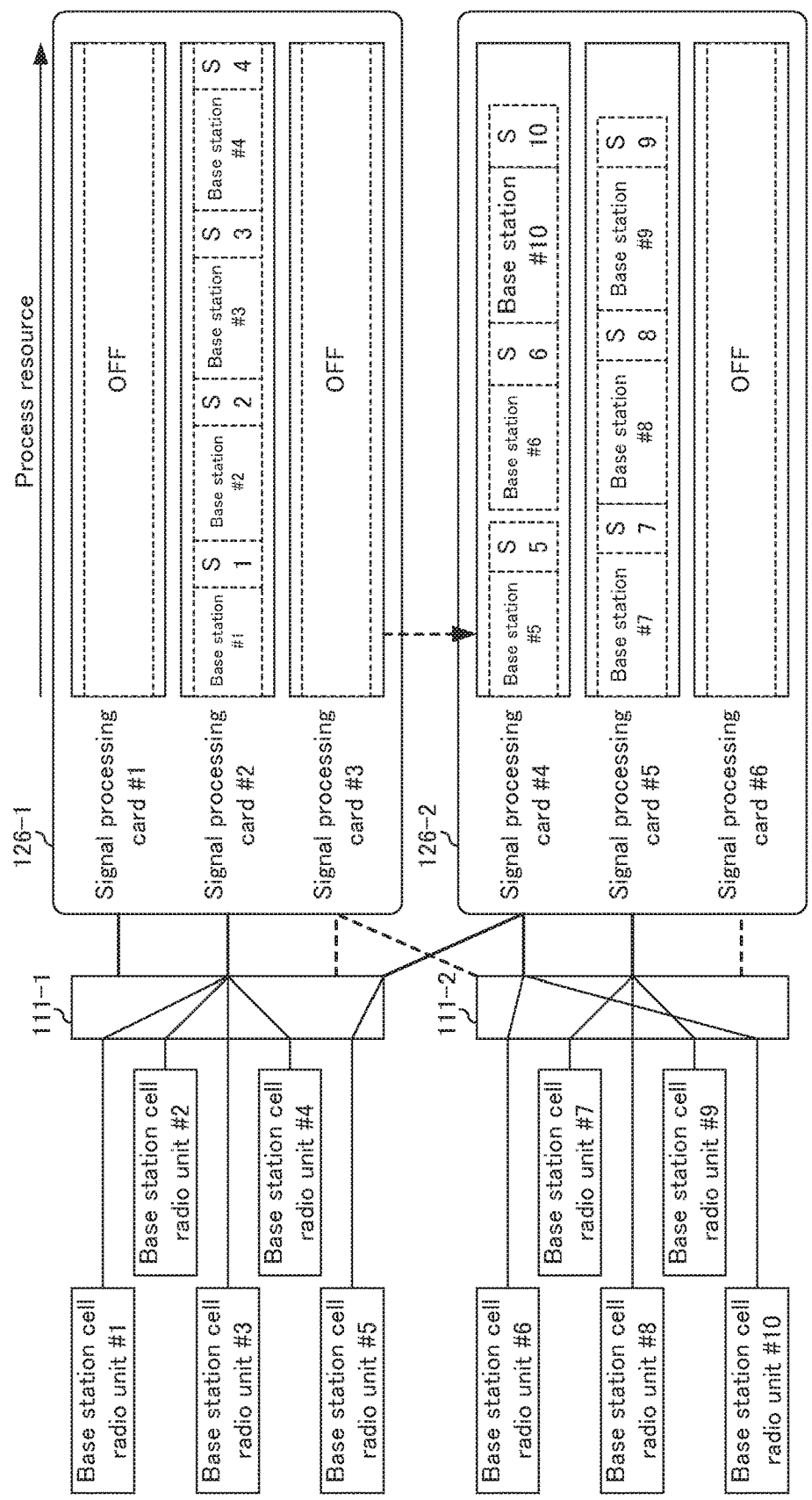

RADIO BASE STATION APPARATUS AND RESOURCE ALLOCATION METHOD

TECHNICAL FIELD

The present invention relates to a radio base station apparatus for collecting radio communication processes carried out at a plurality of remote radio units, and a resource allocation method.

BACKGROUND ART

The data traffic of mobile communication has steeply increased due to the rapid popularization of smartphones, tablet terminals and the like in recent years. Therefore, it was internationally agreed at the World Radio Conference held in 2007 (WRC-07) that a band of 3.5 GHz or the like should be secured as a frequency band for 4 G (Generation) such as LTE (Long Term Evolution)-Advanced. It is expected that in the future, in order to deal with the steep increase of traffic, such new frequency bands will be allocated for the 4 G. In addition, as solutions to deal with increased traffic in the entire system, a heterogeneous network configuration has been examined in which a plurality of small cell base stations is installed in the area of a general macrocell base station, high-density installation of small cell base stations, and the like.

Traffic at each radio base station fluctuates per unit time depending on the location where each radio base station is installed. For example, peak data traffic is reached in an office area during daytime which is a working time zone whereas peak data traffic is reached in a residential area during the evening after individuals return home from work or school. In both the areas, the traffic decreases at midnight. In the current system, radio communication process resources are implemented based on the peak traffic of each area for each base station, and the process resources of all the base stations remain operating when the traffic is reduced.

In recent years, to prepare for the time in the future when there will be a high-density installation of small cell base stations that correspond to the steep traffic increase, an architecture has been proposed that is referred to as C-RAN for collecting, in one base station apparatus, radio communication processing units for baseband signal processing or the like of a plurality of base stations. The concept of the C-RAN architecture is based on a technology that enables low cost and low power consumption to be achieved at the base station apparatus by efficiently sharing the process resources of the collected radio communication processing units among the plurality of base stations. In other words, since the radio communication processes are collected in one base station apparatus, and since ideally the traffic of all the areas can be dealt with in an average form by implementing the process resources based upon peak mobile data traffic, a small apparatus size and low cost can be achieved. In addition, this technology enables the number of process resources that operatd during low traffic to be dramatically reduced by resource sharing, thus achieving low power consumption.

Here, the efficient achievement of the C-RAN architecture necessitates an arithmetic scheduling (resource allocation control) technology for reducing the number of baseband cards or the number of computing units to be operated as much as possible by sharing the computing units collected according to the fluctuation of communication traffic of each base station. As arithmetic scheduling technology (arithmetic resource allocation technology) for the base station apparatus, several technologies have been disclosed (e.g., refer to PTL. 1 to 3).

PTL. 1 discloses a technology for preventing a call loss by efficiently allocating resources at a base station having a card for performing a plurality of baseband signal processes under traffic changed with time. According to this technology, resource monitoring means, resource control means, and traffic recording means are provided, and process resource reallocation is started when the number of available resources is lower than a threshold value. Further, the threshold value is changed on the basis of the most frequently generated call at each time zone. In other words, unnecessary process resource reallocation is prevented by changing the threshold value on the basis of the number of resources that are used for the most frequently generated call.

PTL. 2 discloses a technology for controlling the number of baseband cards in an operated state at a radio base station apparatus. This radio base station apparatus is a base station apparatus that includes a plurality of baseband cards, a measurement unit configured to measure the amount of each resource that is used, and a control unit configured to perform resource reception switching of each baseband card on the amount of the resource that is used. At this radio base station apparatus, the reception switching is carried out in consideration of a card capable of receiving both an existing service and a service to which a HSDPA (High-Speed Downlink Packet Access) method or a HSUPA (High-Speed Uplink Packet Access) method is applied (hereinafter, referred to as HS service) and a card incapable of receiving the HS service.

PTL. 3 discloses a technology for switching the connection state of a plurality of radio resources in a radio communication system that uses an OFDMA (Orthogonal Frequency Division Multiple Access) method. This technology is characterized in that a frequency bandwidth allocated to each sector is changed corresponding to the number of terminals, and a base station apparatus includes radio resource allocation means for each sector and resource connection state switching means corresponding thereto.

CITATION LIST

Patent Literature

PTL. 1: JP2004-343309A
PTL. 2: JP2011-101104A
PTL. 3: WO08/149403A1

SUMMARY OF INVENTION

Problems to be Solved by Invention

However, since the technology disclosed in PTL. 1 is a technology concerning process resource allocation in a single base station apparatus, no consideration is given to switching overhead for reallocating process resources among a plurality of base station apparatuses. As a result, when the baseband signal processing units of the plurality of base stations are collected, there is a problem in which frequent resource switching among the base stations may generate large switching overhead.

Similarly, in the technology disclosed in PTL. 2, no consideration is given to switching overhead when resource reception switching is carried out among a plurality of base station apparatuses. As a result, when the baseband signal processing units of the plurality of base stations are collected, there is a problem in which frequent resource switching among the base stations may generate large switching overhead.

In the case of the technology disclosed in PTL. 3, since a bandwidth totaling all the plurality of radio resources is invariable, it is difficult to reduce the number of process resources according to traffic. For example, when there are six radio communication resources corresponding to the processing of a bandwidth of 5 MHz, the technology enables switching between a base station configuration (10 MHz band×3 sectors) and a base station configuration (20 MHz band×1 sector 3+5 MHz band×2 sectors) or the like. However, the technology is not designed to enable further reduction of the number of process resources according to the traffic.

Thus, in a general radio base station apparatus, when the baseband signal processing units of a plurality of base stations are collected, and resource control is carried out by using a plurality of baseband cards, there is a problem in which frequent resource switching, if it occurs, may increase switching overhead. This problem occurs because resource switching overhead among the plurality of base stations is too large to be ignored compared with resource switching in a single base station apparatus, and also because since the resource control is carried out by using only traffic information or a resource use rate at the time, frequent resource switching easily occurs. Similarly, for processing at a given base station, when allocation of process resources is dynamically switched to a different baseband card, there is a possibility that instantaneous switching may not be sufficient.

It is therefore an object of the present invention to provide a radio base station apparatus and a resource allocation method capable of solving the aforementioned problems.

Solution to Problems

A radio base station apparatus according to the present invention, which is for collecting radio signal processes carried out at a plurality of base station cell radio units, includes a baseband processing pool in which a plurality of signal processing modules for carrying out the radio signal processes are collected, a traffic history storage unit that is configured to store traffic results at the plurality of base station cell radio units as traffic history, a traffic database that is configured to store traffic data learned on the basis of the traffic history that indicates the traffic results, a traffic prediction unit that is configured to predict, on the basis of the traffic data and the traffic history, traffic fluctuation after a predetermined time, and a process resource control unit that is configured to control, on the basis of the predicted traffic fluctuation, the allocation of process resources in the signal processing modules at every predetermined time intervals.

A resource allocation method according to the present invention, which is in an apparatus for collecting radio signal processes carried out at a plurality of base station cell radio units, includes processing for storing traffic results at the plurality of base station cell radio units as traffic history, processing for storing traffic data learned on the basis of the traffic history that indicates the traffic results, processing for predicting, on the basis of the traffic data and the traffic history, traffic fluctuation after a predetermined time, and processing for controlling, on the basis of the predicted traffic fluctuation, the allocation of process resources in a plurality of signal processing modules for carrying out the radio signal processes at every predetermined time interval.

Effects of Invention

As described above, according to the present invention, switching overhead generated by frequent resource switching can be reduced in the base station apparatus in which the baseband processes of the plurality of base stations are collected.

BRIEF DESCRIPTION OF DRAWINGS

FIG. 5B is a diagram illustrating an example of a manner in which process resource control is carried out by the process resource control unit illustrated in FIG. 1.

FIG. 7B is a diagram illustrating an example of a manner in which process resource control is carried out by the process resource control unit illustrated in FIG. 6.

FIG. 12B is a diagram illustrating an example of a manner in which process resource control is carried out by the process resource control unit illustrated in FIG. 10.

DESCRIPTION OF EMBODIMENTS

Hereinafter, the embodiments of the present invention will be described with reference to the drawings.

(First Embodiment)

Figure 1:
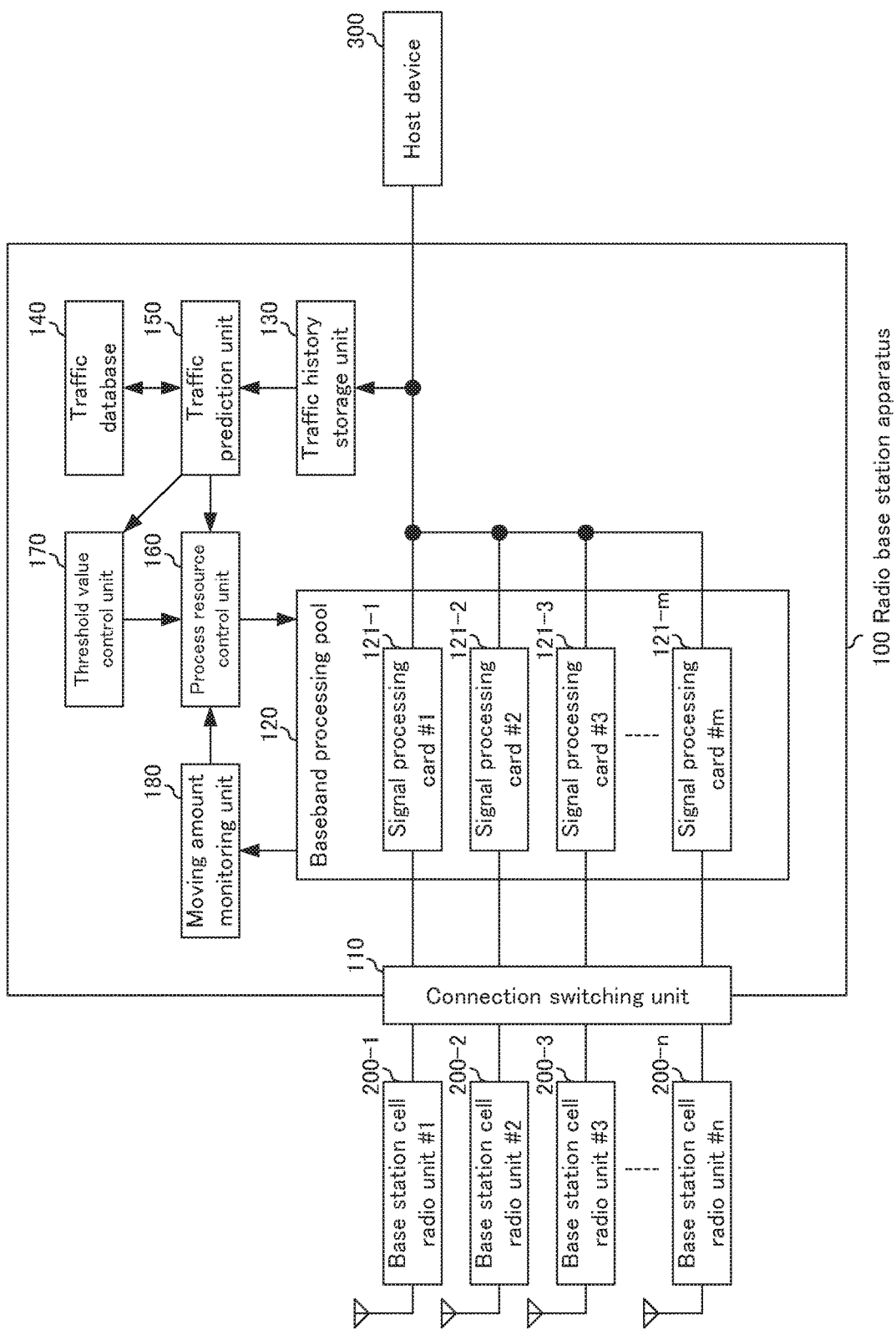
FIG. 1 is a diagram illustrating a radio base station apparatus according to the first embodiment of the present invention.

FIG. 1 is a diagram illustrating a radio base station apparatus according to the first embodiment of the present invention.

As illustrated in FIG. 1, radio base station apparatus 100 according to the embodiment includes connection switching unit 110, baseband processing pool 120 in which signal processing cards 121-1 to 121-m (m is integer of 2 or more), that are a plurality of signal processing modules, are collected, traffic history storage unit 130, traffic database 140, traffic prediction unit 150, process resource control unit 160, threshold value control unit 170, and moving amount monitoring unit 180.

Signal processing cards 121-1 to 121-m are signal processing modules for performing radio signal processing in base station cell radio units 200-1 to 200-n (n is integer of 2 or more) that are a plurality of remote radio units (RRU: Remote Radio Unit). Layer-1 processing (baseband signal processing) of a radio communication method such as LTE-Advanced is carried out while sharing process resources among base station cell radio units 200-1 to 200-n by using, for example, signal processing cards 121-1 to 121-m in baseband processing pool 120 in which signal processing cards 121-1 to 121-m are collected. The radio sides of signal processing cards 121-1 to 121-m are connected, by using an optical fiber, a radio back hole (front hole) or the like, to respective base station cell radio units 200-1 to 200-n via connection switching unit 110. Here, the radio communication method implemented in baseband processing pool 120 may be a radio method other than the LTE-Advanced, and a layer to be processed may be Layer-2 or the like except Layer-1.

Traffic history storage unit 130 stores, on the basis of radio resource information or the like transferred from host device 300 configured to process an upper layer, a given day's traffic results in base station cell radio units 200-1 to 200-n as traffic history. Traffic history storage unit 130 counts and stores, at the same time interval as that of traffic data stored in traffic database 140, the traffic results of respective base station cell radio units 200-1 to 200-n.

Traffic database 140 stores the traffic data of respective base station cell radio units 200-1 to 200-n at a predetermined time interval (e.g., 10 minutes, 30 minutes, or 1 hour). This traffic data may be fixed traffic data dependent only on the position information of respective base station cell radio units 200-1 to 200-n, or statistical traffic data dependent on the position information and the date information of respective base station cell radio units 200-1 to 200-n. When the traffic data stored in traffic database 140 is statistical traffic data, traffic database 140 stores traffic data learned on the basis of daily traffic results recorded by traffic history storage unit 130. Further, traffic database 140 updates the traffic data through this learning. The position information may be information of an office area, a residential area, a factory area, a commercial area, a stadium area, a concert hall area, an indoor area, or the like. The date information may be information of a day of the week, a weekday, a holiday, a day before a holiday, a national holiday, a weekend, a year end and the start of a new year, Golden Week holidays, the periods and the dates of holding various events (sports, concerts, and drama performances), or the like. When the date information is also used, traffic database 140 stores a plurality of traffic data of respective base station cell radio units 200-1 to 200-n.

Traffic prediction unit 150 predicts, on the basis of the traffic data of respective base station cell radio units 200-1 to 200-n stored in traffic database 140 and the daily traffic history stored in traffic history storage unit 130, traffic fluctuation in respective base station cell radio units 200-1 to 200-n at a subsequent time zone (next time interval). Traffic prediction unit 150 notifies the prediction result to process resource control unit 160. Further, traffic prediction unit 150 accumulates differences between the traffic data stored in traffic database 140 and the traffic history for respective base station cell radio units 200-1 to 200-n. Accordingly, traffic prediction unit 150 constructs traffic variance data to calculate a variance value. Traffic prediction unit 150 then notifies the calculated variance value to threshold value control unit 170.

Process resource control unit 160 carries out allocation control of process resources at each given set period (fixed time interval) based on information about the traffic prediction result (traffic fluctuation) notified from traffic prediction unit 150, the margin values of respective base station cell radio units 200-1 to 200-n notified from threshold value control unit 170, the moving amounts or the moving time of respective base station cell radio units 200-1 to 200-n notified from moving amount monitoring unit 180, the maximum throughput of respective signal processing cards 121-1 to 121-m, or the like.

Threshold value control unit 170 calculates, on the basis of the variance value notified from traffic prediction unit 150, the margin value (threshold value) of a process resource amount necessary for each of base station cell radio units 200-1 to 200-n. Threshold value control unit 170 then notifies the calculated margin value to process resource control unit 160.

Moving amount monitoring unit 180 records a moving amount or a moving time, which is a processing load amount for moving the radio signal processing of base station cell radio units 200-1 to 200-n from a signal processing card currently engaged in the radio signal processing to another signal processing card. This moving amount is a moved data amount or an overhead processing amount or the like when the signal processing of base station cell radio units 200-1 to 200-n that is executed at the time is moved to another signal processing card. The moving amount is reported from signal processing cards 121-1 to 121-m. The moving time is the processing time period that is required to move the signal processing of base station cell radio units 200-1 to 200-n that is executed at the time to another signal processing card. Further, moving amount monitoring unit 180 reports the recorded moving amount or moving time to process resource control unit 160.

Hereinafter, an operation according to the embodiment illustrated in FIG. 1 will be described.

Radio base station apparatus 100, according to the embodiment, collectively executes, by using signal processing cards 121-1 to 121-m provided in baseband processing pool 120, radio communication processing such as Layer-1 processing (baseband signal processing), for example, LTE-Advanced, of base station cell radio units 200-1 to 200-n. Due to process resource sharing among signal processing cards 121-1 to 121-m, the base station cell radio unit, from among base station cell radio units 200-1 to 200-n that are subjected to processing by processing cards from among processing cards 121-1 to 121-m, will vary. Accordingly, connection switching control with respective base station cell radio units 200-1 to 200-n is executed by connection switching unit 110. Each transmitted/received signal whose connection destination has been switched by connection switching unit 110 is connected to base station cell radio units 200-1 to 200-$n$ by an optical fiber or a radio back hole (front hole).

Further, radio base station apparatus 100 includes, in order to execute the aforementioned process resource sharing, process resource control unit 160 configured to control process resources by using traffic fluctuation predicted by traffic prediction unit 150. Traffic prediction unit 150 predicts, at each predetermined period (fixed time interval), traffic at a next time zone from daily traffic data (average value) stored in traffic database 140 and the traffic history (result) of the day counted by traffic history storage unit 130.

Figure 2:
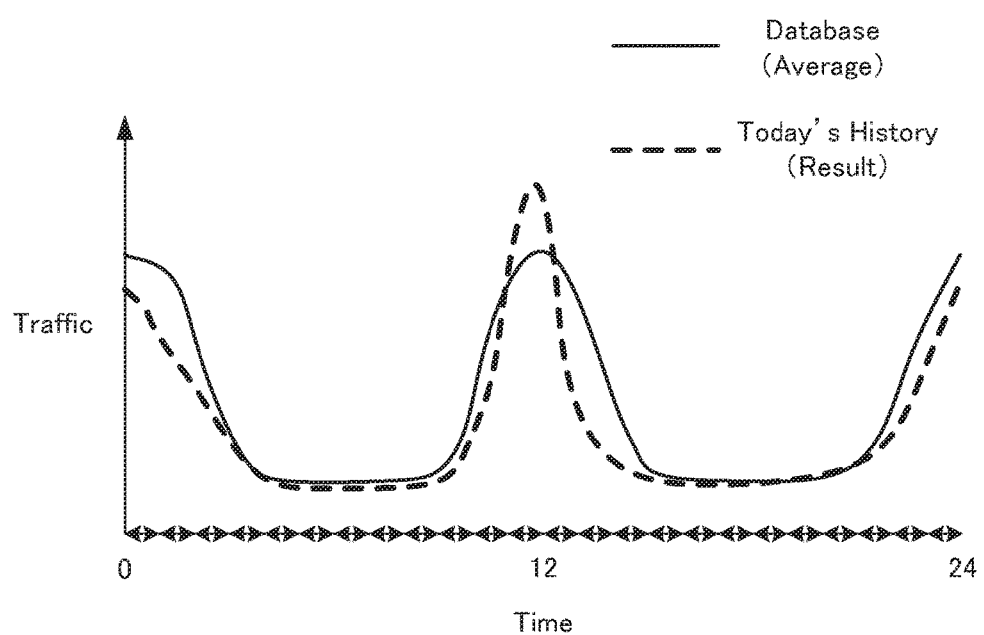
FIG. 2 is a graph illustrating an example of daily traffic data (average value) stored in a traffic database illustrated in FIG. 1 and the traffic history (result) of the day counted by a traffic history storage unit illustrated in FIG. 1.

FIG. 2 is a graph illustrating an example of daily traffic data (average value) stored in traffic database 140 illustrated in FIG. 1 and the traffic history (result) of the day counted by traffic history storage unit 130 illustrated in FIG. 1.

Traffic database 140 stores, on the basis of the aforementioned position information (office area, residential area, or the like) and the aforementioned date information (weekday, weekend, period and date of holding event, or the like), traffic data for each position information and for each date information of respective base station cell radio units 200-1 to 200-n. This data may be fixed traffic data that is generated by referring to a certain traffic model, or traffic data learned/updated by using daily traffic history (result) with the data of the traffic model set as initial data. As illustrated in FIG. 2, traffic database 140 creates a database of traffic volume during the period at each fixed time interval for each of base station cell radio units 200-1 to 200-n.

Traffic history storage unit 130 records the traffic result of the day as traffic history on the basis of radio resource allocation information or the like transferred from host device 300 during communication. For example, for each of base station cell radio units 200-1 to 200-n, traffic history storage unit 130 counts, user allocation information or modulation mode information to radio resources determined for each TTI (Transmission Time Interval). Accordingly, traffic history storage unit 130 calculates traffic for each TTI. Then, traffic history storage unit 130 accumulates or averages traffic at the same time interval as that of the traffic data stored in traffic database 140, or stores only a maximum value during the time interval. Thus, traffic history storage unit 130 records the traffic result as the day's tendency as illustrated in FIG. 2.

Figure 3:
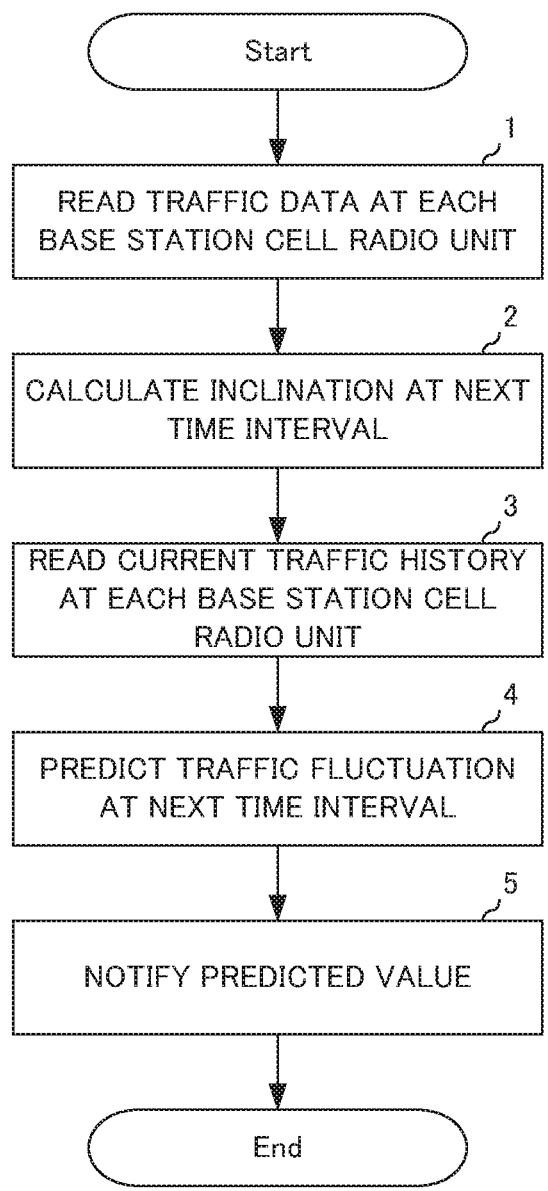
FIG. 3 is a flowchart illustrating an example of traffic prediction processing at a traffic prediction unit illustrated in FIG. 1.

FIG. 3 is a flowchart illustrating an example of traffic prediction processing at a traffic prediction unit illustrated in FIG. 1.

Traffic prediction unit 150 predicts traffic of a next fixed time interval not dynamically but at each predetermined period (fixed time interval) such as 10 minutes, 30 minutes, or 1 hour. This processing is carried out to prevent an increase in switching overhead caused by frequent process resource switching. Traffic prediction unit 150 carries out, for each of base station cell radio units 200-1 to 200-n, traffic prediction by using the traffic data of each of base station cell radio units 200-1 to 200-n stored in traffic database 140 and the daily traffic result stored in traffic history storage unit 130.

First, in step 1, traffic prediction unit 150 reads the traffic data of each of base station cell radio units 200-1 to 200-n from traffic database 140. Then, in step 2, traffic prediction unit 150 calculates the traffic fluctuation tendency (inclination) of a next fixed time interval from the read traffic data. In step 3, traffic prediction unit 150 reads the traffic history of each of base station cell radio units 200-1 to 200-n from traffic history storage unit 130.

Then, in step 4, traffic prediction unit 150 adds the calculated inclination to or multiplies the traffic history by it to set its result as a predicted traffic value after the fixed time interval. For example, the inclination can be calculated by $P(A+\tau)-P(A)$, and a predicted traffic value at time $(A+\tau)$ can be calculated by $Q(A)+P(P+\tau)-P(A)$, in which $P(t)$ is traffic data at time t, $Q(t)$ is a traffic result of the day, A is time at a prediction point of time, and $(A+\tau)$ is next time after the fixed time interval. Alternatively, traffic prediction unit 150 may derive the inclination as a rate by $P(A+\tau)/P(A)$, and calculate the predicted traffic value at time $(A+\tau)$ by $Q(A) \times P(A+\tau)/P(A)$.

This way, traffic prediction unit 150 calculates a fluctuation tendency (inclination) until the next time from the traffic data stored in traffic database 140. Traffic prediction unit 150 then multiplies the traffic result of the day stored in traffic history storage unit 130 by the inclination. Accordingly, traffic prediction unit 150 carries out traffic prediction at the next time interval.

In step 5, traffic prediction unit 150 notifies a predicted traffic value that is a traffic prediction result to process resource control unit 160. When necessary, traffic prediction unit 150 updates the traffic data stored in traffic database 140 by using the traffic result of the day stored in traffic history storage unit 130. In other words, traffic prediction unit 150 calculates, by using the traffic result of the day, an average among daily traffic data, and sets the calculated average value as new traffic data.

Further, traffic prediction unit 150 accumulates differences between the traffic data stored in traffic database 140 and the traffic results of the days stored in traffic history storage unit 130. Accordingly, traffic prediction unit 150 calculates a variance value among the time intervals for each of base station cell radio units 200-1 to 200-n.

Figure 4:
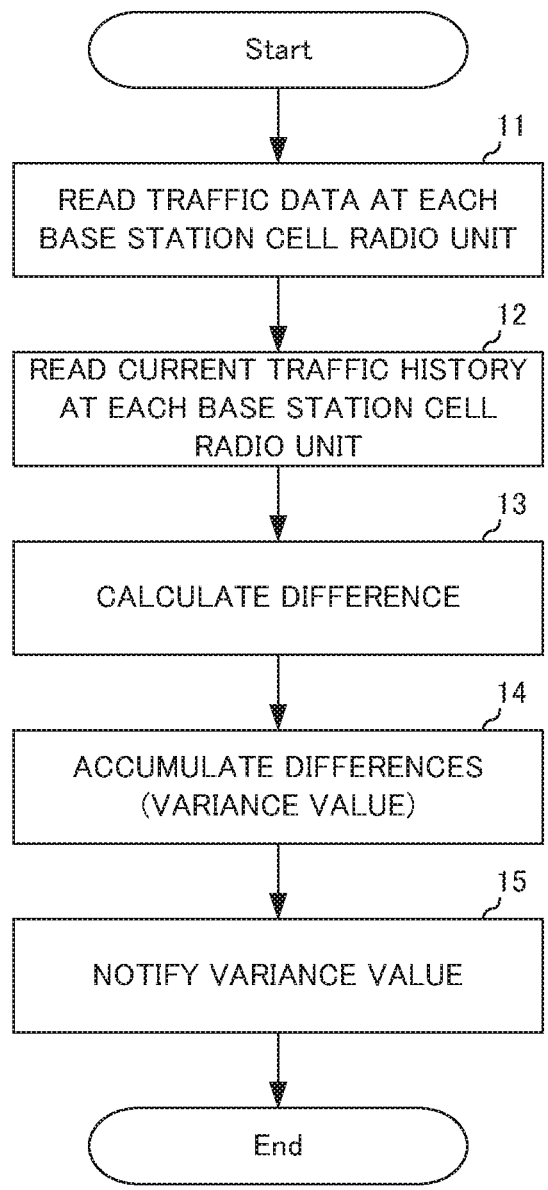
FIG. 4 is a flowchart illustrating an example of variance value calculation processing at the traffic prediction unit illustrated in FIG. 1.

FIG. 4 is a flowchart illustrating an example of variance value calculation processing at traffic prediction unit 150 illustrated in FIG. 1.

First, in step 11, traffic prediction unit 150 reads the traffic data of each of base station cell radio units 200-1 to 200-n from traffic database 140. Here, traffic prediction unit 150 may use the traffic data read in step 1 of the aforementioned traffic prediction processing. In step 12, traffic prediction unit 150 reads the traffic history of each of base station cell radio units 200-1 to 200-n from traffic history storage unit 130. Here, traffic prediction unit 150 may use the traffic history read in step 3 of the aforementioned traffic prediction processing.

Then, in step 13, traffic prediction unit 150 calculates the difference between the read traffic data and the read traffic history. In step 14, traffic prediction unit 150 accumulates such calculated differences to calculate a variance value among the time intervals for each of base station cell radio units 200-1 to 200-n. In step 15, traffic prediction unit 150 notifies the calculated variance value to threshold value control unit 170.

For example, when the accumulation (variance value) of differences between the traffic data (average value of every day) and daily traffic results is large, it indicates a relatively high possibility that the error of the prediction calculated from the traffic data will be large. On the other hand, when the accumulation (variance value) of the differences is small, it indicates a high possibility that the error of the prediction will be relatively small.

Threshold value control unit 170 calculates, on the basis of the accumulation (variance value) of the differences notified from traffic prediction unit 150, a threshold value (margin value) for each of base station cell radio units 200-1 to 200-n at the next time interval. When the accumulation (variance value) of the differences is large, in view of the high possibility of a large error, threshold value control unit 170 calculates a relatively large margin value. On the other hand, when the accumulation (variance value) of the differences is small, in view of the high possibility of a small error, threshold value control unit 170 calculates a relatively small margin value. Threshold value control unit 170 notifies the calculated margin value to process resource control unit 160.

Then, process resource control unit 160 carries out process resource control to determine which of base station cell radio units 200-1 to 200-n is subjected to processing at which of signal processing cards 121-1 to 121-m. Here, process resource control unit 160 executes the process resource control of the next fixed time interval not dynamically but at each preset fixed time interval such as 10 minutes, 30 minutes, or 1 hour. This processing is carried out to prevent an increase in switching overhead caused by frequent process resource switching. At this time, the predicted traffic value of the fixed time interval for each of base station cell radio units 200-1 to 200-n is notified from traffic prediction unit 150, and the margin value added for each of base station cell radio units 200-1 to 200-n is notified from threshold value control unit 170. Accordingly, process resource control unit 160 executes process resource control by using these values.

Basically, in a case where the radio communication processing of one or a plurality of base station cell radio units can be carried out with signal processing cards 121-1 to 121-m according to traffic, when (predicted traffic value+ margin value) one or a plurality of base station cell radio units currently processed with any one of the signal processing cards is reduced to enable accommodation of the traffic of the other base station cell radio unit, process resource control unit 160 moves the radio communication processing of the base station cell radio unit to the signal processing card. On the other hand, when (predicted traffic value+margin value) of a plurality of base station cell radio units currently processed with the signal processing card increases to exceed a traffic volume accommodatable by the signal processing card, process resource control unit 160 moves the radio communication processing of one of the base station cell radio units to the other signal processing card.

At this time, when there is a plurality of base station cell radio unit candidates whose processing is to be moved among signal processing cards 121-1 to 121-m, process resource control unit 160 determines which of the base station cell radio units is subjected to radio communication processing movement on the basis of the moving amount of each of the base station cell radio units obtained by moving amount monitoring unit 180. In other words, the size of the moving amount means the size of switching overhead among signal processing cards 121-1 to 121-m. Accordingly, process resource control unit 160 executes, in order to reduce the switching overhead, control to move the radio communication processing of a base station cell radio unit that has the smallest possible moving amount. There is a possibility that the moving amount of each base station cell radio unit will vary from time to time. Therefore, moving amount monitoring unit 180 receives the moving amounts of all the base station cell radio units processed at the time from each of signal processing cards 121-1 to 121-m at a fixed time interval to monitor the moving amounts, and notifies the result to process resource control unit 160.

Figure 5A:
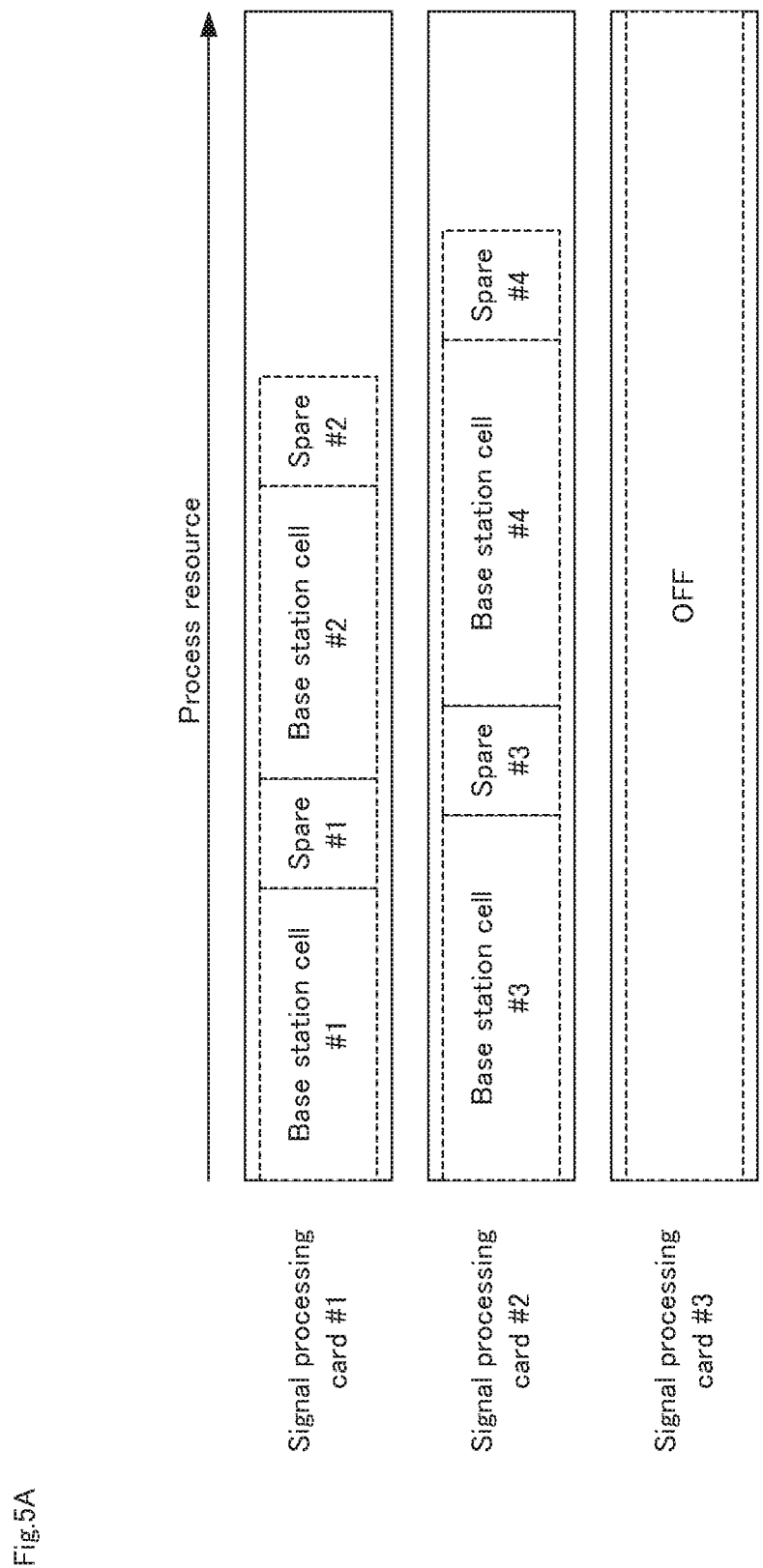
FIG. 5A is a diagram illustrating an example of a manner in which process resource control is carried out by a process resource control unit illustrated in FIG. 1.
Figure 5C:
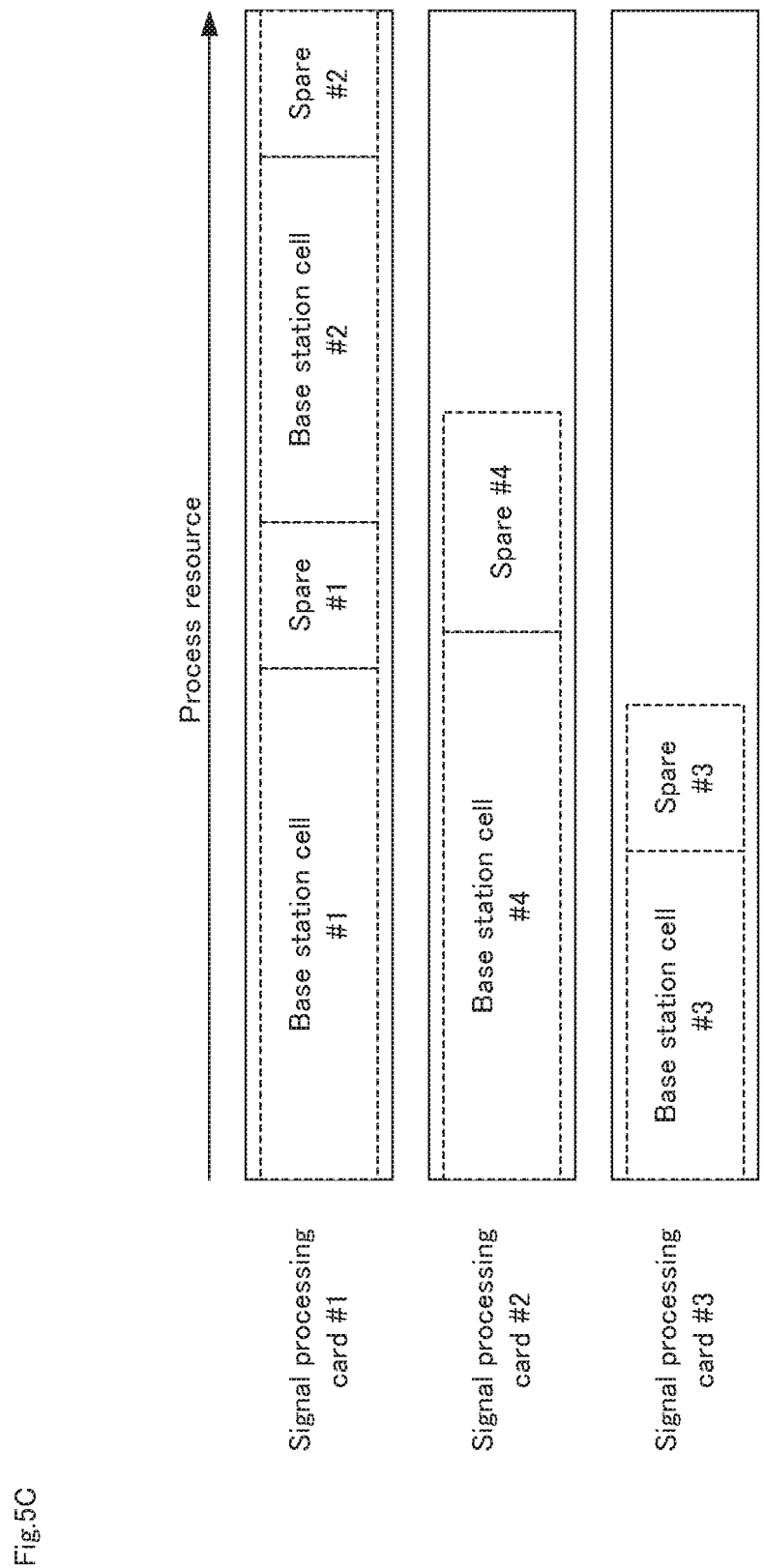
FIG. 5C is a diagram illustrating an example of a manner in which process resource control is carried out by the process resource control unit illustrated in FIG. 1.

FIGS. 5A to 5C are diagrams each illustrating an example of the manner in which process resource control is carried out by process resource control unit 160 illustrated in FIG. 1. An example where the number of signal processing cards is three, namely #1 to #3, and the number of base station cell radio units (base station cells in FIGS. 5A to 5C) is four, namely #1 to #4, will be described.

For example, as illustrated in FIG. 5A, the radio communication processing of base station cells #1 and #2 is allocated to signal processing card #1, and the radio communication processing of base station cells #3 and #4 is allocated to signal processing card #2. "Spare" illustrated in FIG. 5A indicates the margin value of each base station cell. Now, consideration will be given to a case where a predicted traffic value notified from traffic prediction unit 150 indicates the predicted increase of traffic at base station cells #1 and #4 at a next time interval.

When a difference (variance value) between a traffic data average and a real traffic result is small, as illustrated in FIG. 5B, only a small processing amount is necessary for a spare resource secured as a margin value. Accordingly, even with the same process resource allocation as that immediately before (FIG. 5A), it is predicted that the processing amount will not exceed the throughput of each signal processing card.

On the other hand, when the processing amount of the spare resource secured as the margin value calculated from the difference (variance value) is large and, with the same process resource as that immediately before, it is predicted that the processing amount of signal processing card #2 will exceed the throughput of signal processing card #2, and process resource control unit 160 will move the radio communication processing of one of base station cells #3 and #4 allocated to signal processing card #2 to signal processing card #3. In this case, when the moving amount of base station cell #3 notified from moving amount monitoring nit 180 is smaller than that of base station cell #4, as illustrated in FIG. 5C, process resource control unit 160 moves the radio communication processing of base station cell #3 from signal processing card #2 to signal processing card #3.

Thus, the process resource allocation control is carried out at a given period (fixed time interval) such as 10 minutes, 30 minutes, or 1 hour and, in this case, the traffic prediction is executed by using the traffic database storing the daily average and the traffic result of the day. As a result, the occurrence of frequent process resource switching is prevented which improves the accuracy of process resource allocation at the next time interval. The accuracy of the traffic database storing the daily average is indicated as a variance value by accumulating the differences between the database and the traffic results, and is added as the margin value of the required processing amount of each base station cell radio unit. As a result, the accuracy of the traffic database can be reflected in the accuracy of the traffic prediction. In addition, when fluctuation in traffic or margin value among the base station cell radio units necessitates movement of the processing of the base station cell radio units among the signal processing cards, process resource control unit 160 determines which of the base station cell radio units is subjected to processing movement by using the moving amount of each base station cell radio unit notified from each signal processing card. Thus, process resource switching can be carried out with smaller switching overhead.

(Second Embodiment)

Figure 6:
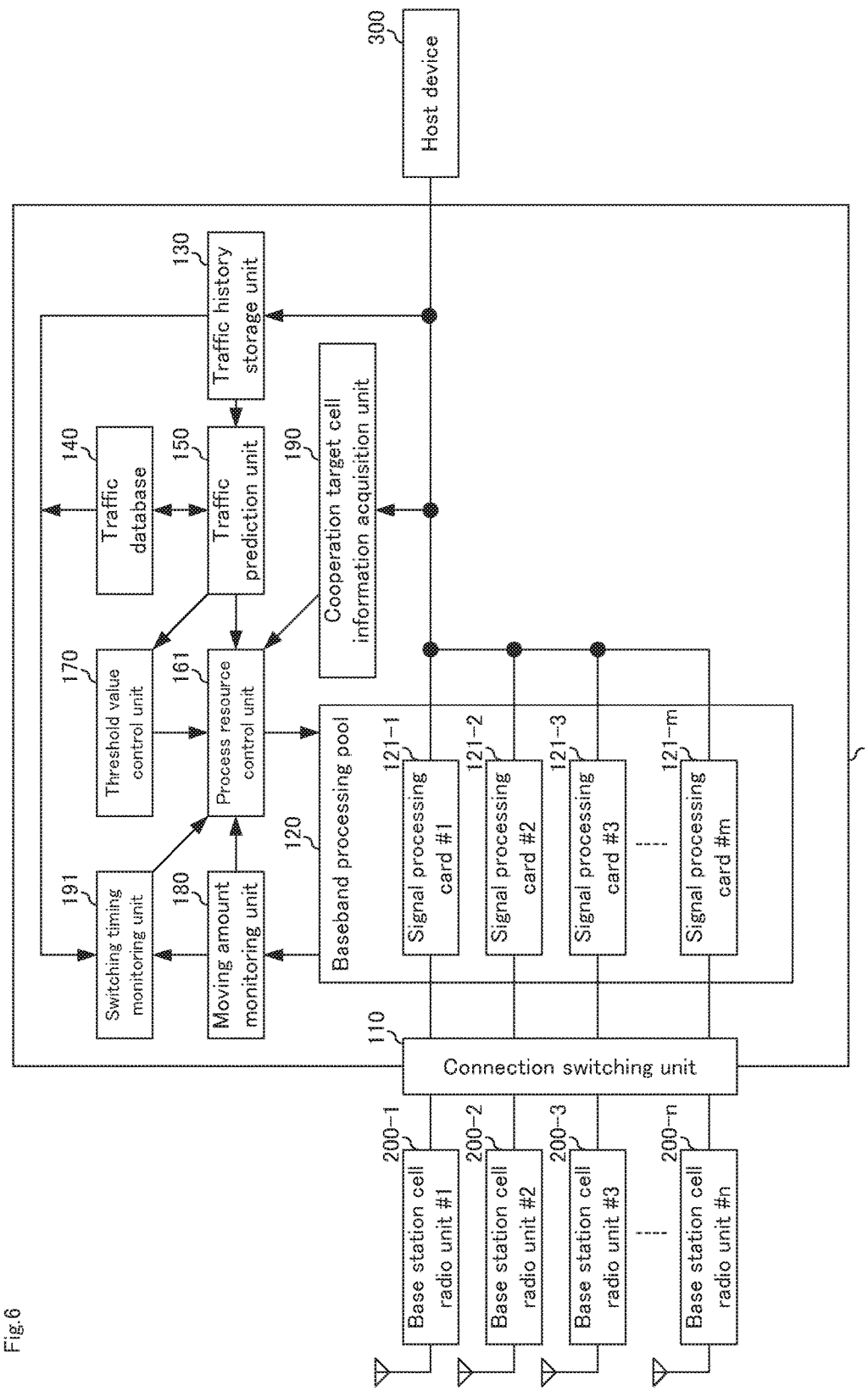
FIG. 6 is a diagram illustrating a radio base station apparatus according to the second embodiment of the present invention.

FIG. 6 is a diagram illustrating a radio base station apparatus according to the second embodiment of the present invention.

As illustrated in FIG. 6, radio base station apparatus 101 according to the embodiment includes connection switching unit 110, baseband processing pool 120 in which signal processing cards 121-1 to 121-m (m is integer of 2 or more) that are a plurality of signal processing modules are collected, traffic history storage unit 130, traffic database 140, traffic prediction unit 150, process resource control unit 161, threshold value control unit 170, moving amount monitoring unit 180, cooperation target cell information acquisition unit 190, and switching timing monitoring unit 191. The units denoted by reference signs similar to those illustrated in FIG. 1 perform the same operations as those illustrated in FIG. 1.

Cooperation target cell information acquisition unit 190 acquires information about a CoMP (Coordinated Multi-Point Transmission and Reception) target cell or a carrier aggregation target cell.

Switching timing monitoring unit 191 determines whether or not process resource control is necessary during a fixed time interval for executing the process resource control.

Hereinafter, an operation according to the embodiment illustrated in FIG. 6 will be described.

As in the case of the first embodiment, radio base station apparatus 101 according to the embodiment collectively executes, by using signal processing cards 121-1 to 121-m provided in baseband processing pool 120, radio communication processing such as Layer-1 processing (baseband signal processing), for example, LTE-Advanced, of base station cell radio units 200-1 to 200-n. Due to process resource sharing among signal processing cards 121-1 to 121-m, which of base station cell radio units 200-1 to 200-n is subjected to processing at which of signal processing cards 121-1 to 121-m varies. Accordingly, connection switching control with respective base station cell radio units 200-1 to 200-n is executed by connection switching unit 110. Each transmitted/received signal whose connection destination of which has been switched by connection switching unit 110 is connected to base station cell radio units 200-1 to 200-n through an optical fiber or a radio back hole (front hole).

Further, radio base station apparatus 101 includes, in order to execute the process resource sharing, process resource control unit 161 configured to control process resources by using traffic fluctuation predicted by traffic prediction unit 150. Traffic prediction unit 150 predicts, at each predetermined period (fixed time interval), traffic at the next time zone (next time interval) for each of base station cell radio units 200-1 to 200-n from daily traffic data (average value) stored in traffic database 140 and the traffic history (result) of the day counted by traffic history storage unit 130. Then, process resource control unit 161 adds a threshold value (margin value) calculated by threshold value control unit 170 to the predicted traffic to carry out processing estimation for each of base station cell radio units 200-1 to 200-n, and controls process resource allocation to signal processing cards 121-1 to 121-m so as to enable efficient accommodation of its processing amount.

As a special operation according to the second embodiment, process resource control unit 161 carries out process resource allocation control taking into account the information acquired by cooperation target cell information acquisition unit 190. Cooperation target cell information acquisition unit 190 acquires information about a CoMP target cell determined on the basis of the arrangement of base station cell radio units 200-1 to 200-n, upper layer processing, or the like from an upper layer (host device 300). The information about the CoMP target cell indicates, for example, from the combination of base station cell radio unit 200-1 and base station radio unit 200-2, which one is a CoMP processing target cell and which one is a carrier aggregation processing target cell. When the combination of base station cell radio unit 200-1 and base station cell radio unit 200-2 is a CoMP processing target cell, at the timing of actually executing Joint-Transmission (TTI) that is one of CoMP processes for a given terminal, the same transmission data is transmitted from both base station cell radio units 200-1 and 200-2 to the terminal. In this case, when the process resources of target base station cell radio unit 200-1 and the process resources of target base station cell radio unit 200-2 are allocated to separate signal processing cards, common transmission data processing such as coding processing for the same transmission data must be carried out at each signal processing card. By allocating the process resources of target base station cell radio unit 200-1 and the process resources of target base station cell radio unit 200-2 to the same signal processing card, the transmission data processing that is to be shared in common between the base station cell radio units can be made common. In other words, a processing amount can be smaller than that when such process resources are allocated to separate signal processing cards. As a result, the operation time of a computing unit in the signal processing card can be reduced to achieve lower power consumption.

Similarly, in the case of the carrier aggregation processing target cell, by allocating the process resources of the target base station cell radio units to the same signal processing card, the processing that is to be shared in common between the base station cell radio units can be made common to achieve a lower processing amount and lower power consumption.

Thus, when there is a plurality of candidates of base station cell radio units to be moved in radio communication processing among signal processing cards 121-1 to 121-m due to predicted traffic, process resource control unit 161 illustrated in FIG. 6 determines which of the base station cell radio units is subjected to radio communication processing movement by using the information acquired by cooperation target cell information acquisition unit 190. In other words, when there is a plurality of process resource allocation candidates to be controlled due to the predicted traffic, process resource control unit 160 executes process resource allocation control so as to allocate as many CoMP processing target cells as possible to the same signal processing card. Further, process resource control unit 161 may carry out the process resource allocation control by combining the information with information about a processing amount notified from moving amount monitoring unit 180 as described above in the first embodiment.

Figure 7A:
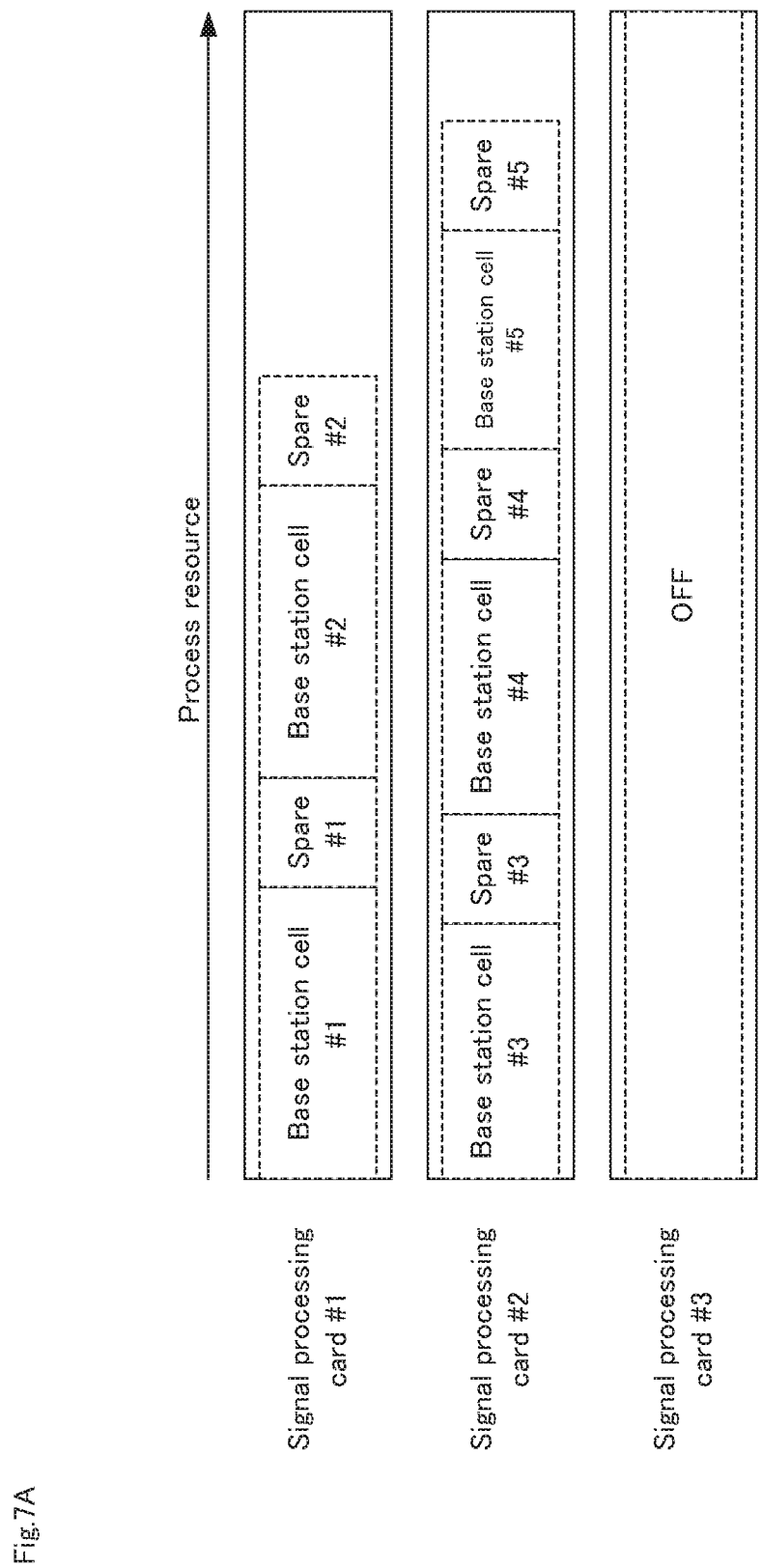
FIG. 7A is a diagram illustrating an example of a manner in which process resource control is carried out by a process resource control unit illustrated in FIG. 6.
Figure 7C:
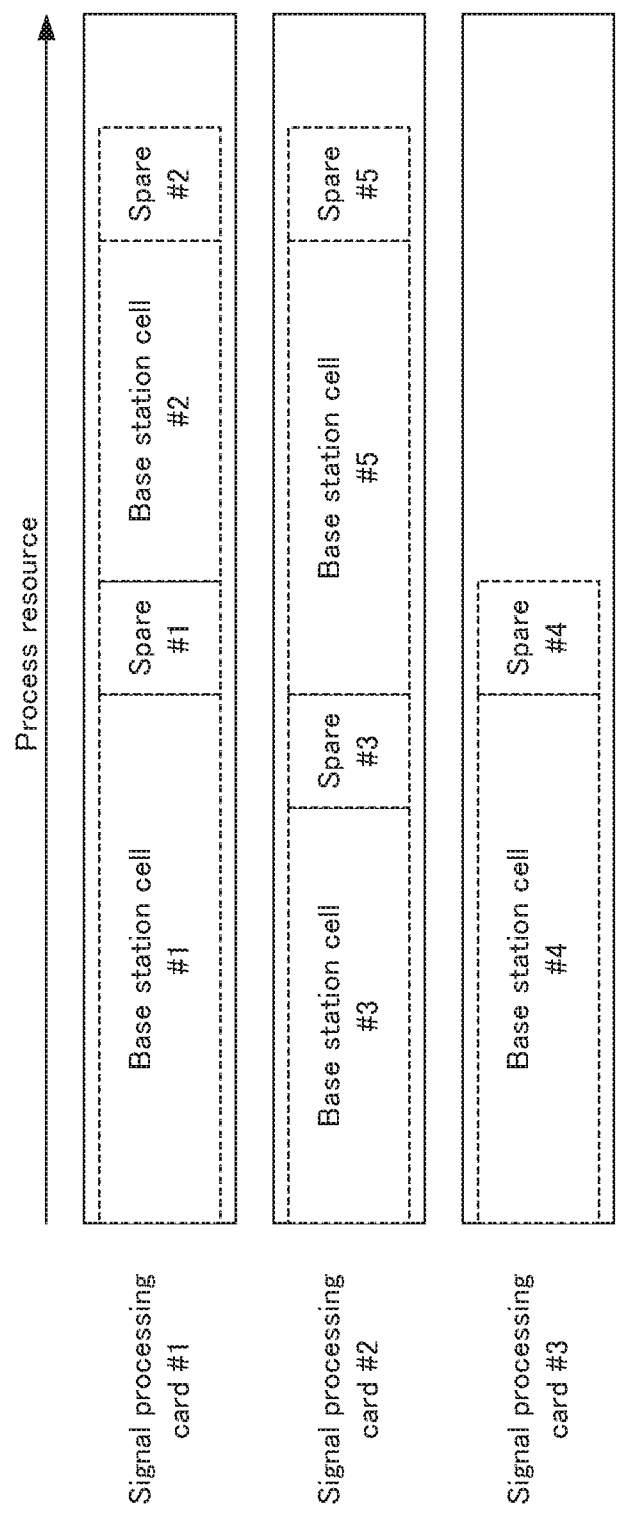
FIG. 7C is diagram illustrating an example of a manner in which process resource control is carried out by the process resource control unit illustrated in FIG. 6.

FIGS. 7A to 7C are diagrams each illustrating an example of a manner in which process resource control is carried out by process resource control unit 161 illustrated in FIG. 1. An example where the number of signal processing cards is three, namely #1 to #3, and the number of base station cell radio units (base station cells in FIGS. 7A to 7C) is five, namely #1 to #5, will be described.

For example, as illustrated in FIG. 7A, the radio communication processing of base station cells #1 and #2 is allocated to signal processing card #1, and the radio communication processing of base station cells #3 to #5 is allocated to signal processing card #2. "Spare" illustrated in FIG. 7A indicates the margin value of each base station cell. Now, consideration will be given to a case where a predicted traffic value notified from traffic prediction unit 150 indicates the predicted increase of traffic at each base station cell at a next time interval.

When the traffic increases at each base station cell, a traffic processing amount at signal processing card #2 exceeds the throughput of signal processing card #2. Accordingly, either the processing of base station cell #4 or the processing of base station cell #5 must be moved to signal processing card #3. When there is no CoMP processing target cell among base station cells #3 to #5, as illustrated in FIG. 7B, process resource control unit 161 moves the processing of base station cell #5 that has a small processing amount to signal processing card #3.

On the other hand, when base station cells #3 and #5 are CoMP processing target cells, there is a possibility that common processing will be carried out. Accordingly, as illustrated in FIG. 7C, process resource control unit 161 allocates the processing of base station cell #3 and the process resources of base station cell #5 to same signal processing card #2, and moves the process resources of base station cell #4 to signal processing card #3.

Thus, the allocation of process resources of the signal processing card is carried out on the basis of the information about the CoMP processing target cells, and the process resources of the CoMP processing target cells are allocated to the same signal processing card. As a result, processing originally required for each base station cell can be used in common to reduce the operation time and the power consumption of the computing unit.

Further, radio base station apparatus 101 according to the second embodiment includes switching timing monitoring unit 191. In the first embodiment, process resource control unit 160 carries out the process resource control on the basis of the predicted traffic notified from traffic prediction unit 150 at each predetermined period (fixed time interval) to reduce the processing overhead accompanying the process resource switching. However, when actual traffic is likely to exceed the predicted value notified from traffic prediction unit 150 within the predetermined time interval, resource switching control must be performed at the timing thereof.

Figure 8:
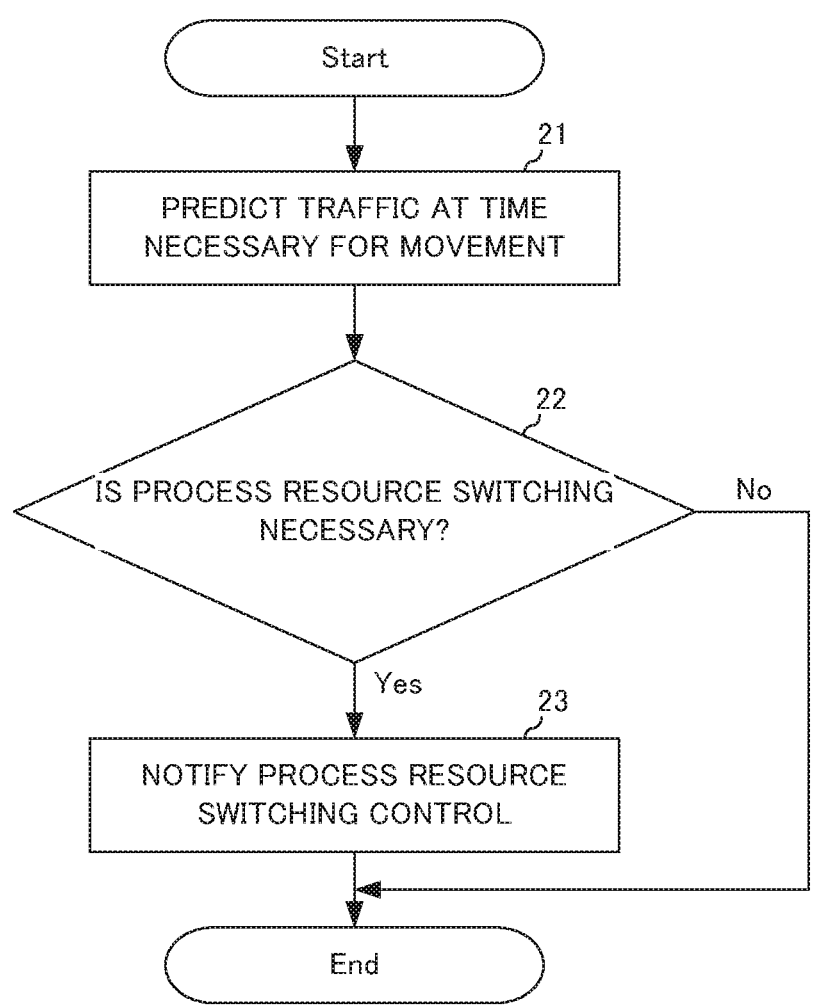
FIG. 8 is a flowchart illustrating an example of processing at a switching timing monitoring unit illustrated in FIG. 6.

FIG. 8 is a flowchart illustrating an example of processing at switching timing monitoring unit 191 illustrated in FIG. 6.

Switching timing monitoring unit 191 obtains a moving amount or moving time for moving the processing of base station cell radio units 200-1 to 200-n, which has been reported from signal processing cards 121-1 to 121-m, from moving amount monitoring unit 180 to understand time that is needed to move the processing of base station cell radio units 200-1 to 200-n. In step 21, switching timing monitoring unit 191 predicts traffic at the point of time when the processing movement of base station cell radio units 200-1 to 200-n is in time for each TTI on the basis of the traffic history stored in traffic history storage unit 130 and the traffic data stored in traffic database 140 for each TTI.

In step 22, switching timing monitoring unit 191 determines whether or not there is any signal processing card which fails in processing, in other words, whether or not there is any signal processing card whose throughput is exceeded by the predicted traffic, at the point of this time as a result of the traffic prediction.

When it determines that there is a signal processing card which whose processing fails, in step 23, switching timing monitoring unit 191 instructs, in order to prevent a processing failure, process resource control unit 161 to carry out process resource control to switch process resource allocation. Instructed process resource control unit 161 moves the processing of base station cell radio units 200-1 to 200-n at timing different from the fixed time interval.

Figure 9:
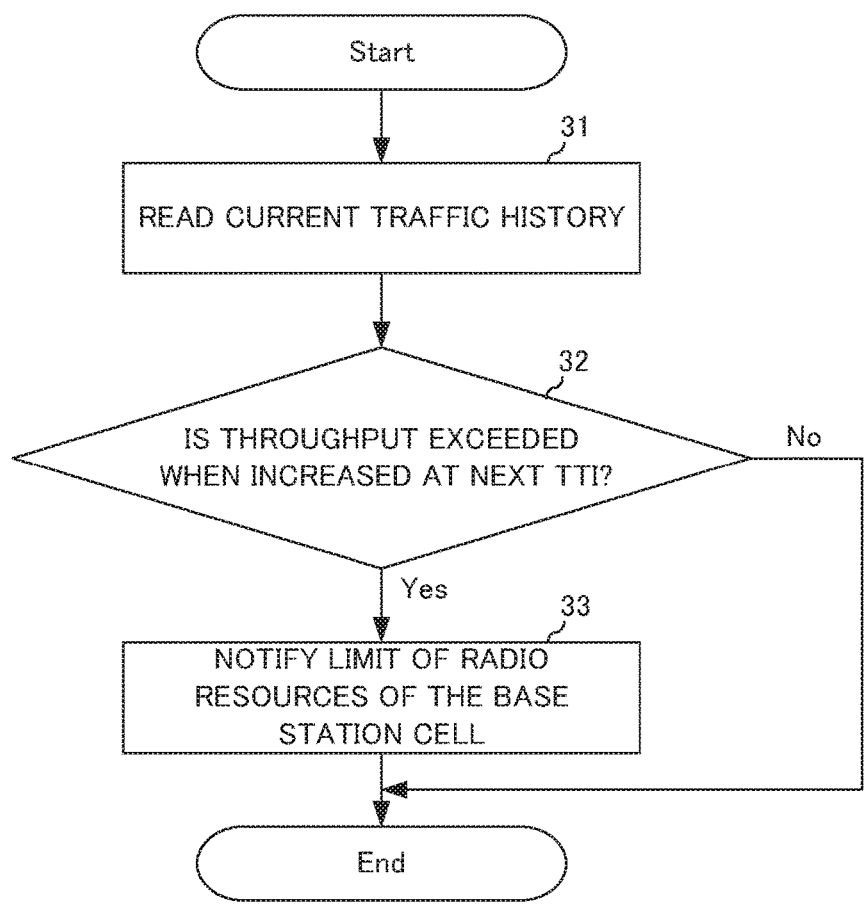
FIG. 9 is a flowchart illustrating another example of processing at the switching timing monitoring unit illustrated in FIG. 6.

FIG. 9 is a flowchart illustrating another example of processing at switching timing monitoring unit 191 illustrated in FIG. 6.

First, in step 31, switching timing monitoring unit 191 reads the traffic history of the present time of each of base station cell radio units 200-1 to 200-n from traffic history storage unit 130. Then, in step 32, switching timing monitoring unit 191 determines, on the basis of the read traffic history of each of base station cell radio units 200-1 to 200-n, whether or not there is any signal processing card whose throughput has been exceeded at when traffic (radio resource allocation) increases even slightly for each of base station cell radio units 200-1 to 200-n at next TTI. When it is determined that there is a signal processing card whose throughput has been exceeded, in step 33, switching timing monitoring unit 191 instructs an upper layer such as host device 300 to put a limit in order to prevent the increase of the radio resource allocation of base station cell radio units 200-1 to 200-n.

Thus, by including switching timing monitoring unit 191, radio base station apparatus 101 according to the second embodiment can perform, even when there is a sudden increase in traffic volume, which is uncontrollable by the traffic prediction at the fixed time interval, process resource control taking into account the processing movement amount (moving time) of each of base station cell radio units 200-1 to 200-n during the fixed time interval. In other words, processing overhead accompanying switching can be reduced basically by executing the process resource switching control at the fixed time interval, and then any sudden increase of the traffic volume that exceeds the predicted traffic can be magaged. Still, when process resource control is not in time, a processing failure that accompanies process resource allocation can be prevented by instructing host device 300 to limit an increase in radio resource allocation of the base station cell radio units.

(Third Embodiment)

Figure 10:
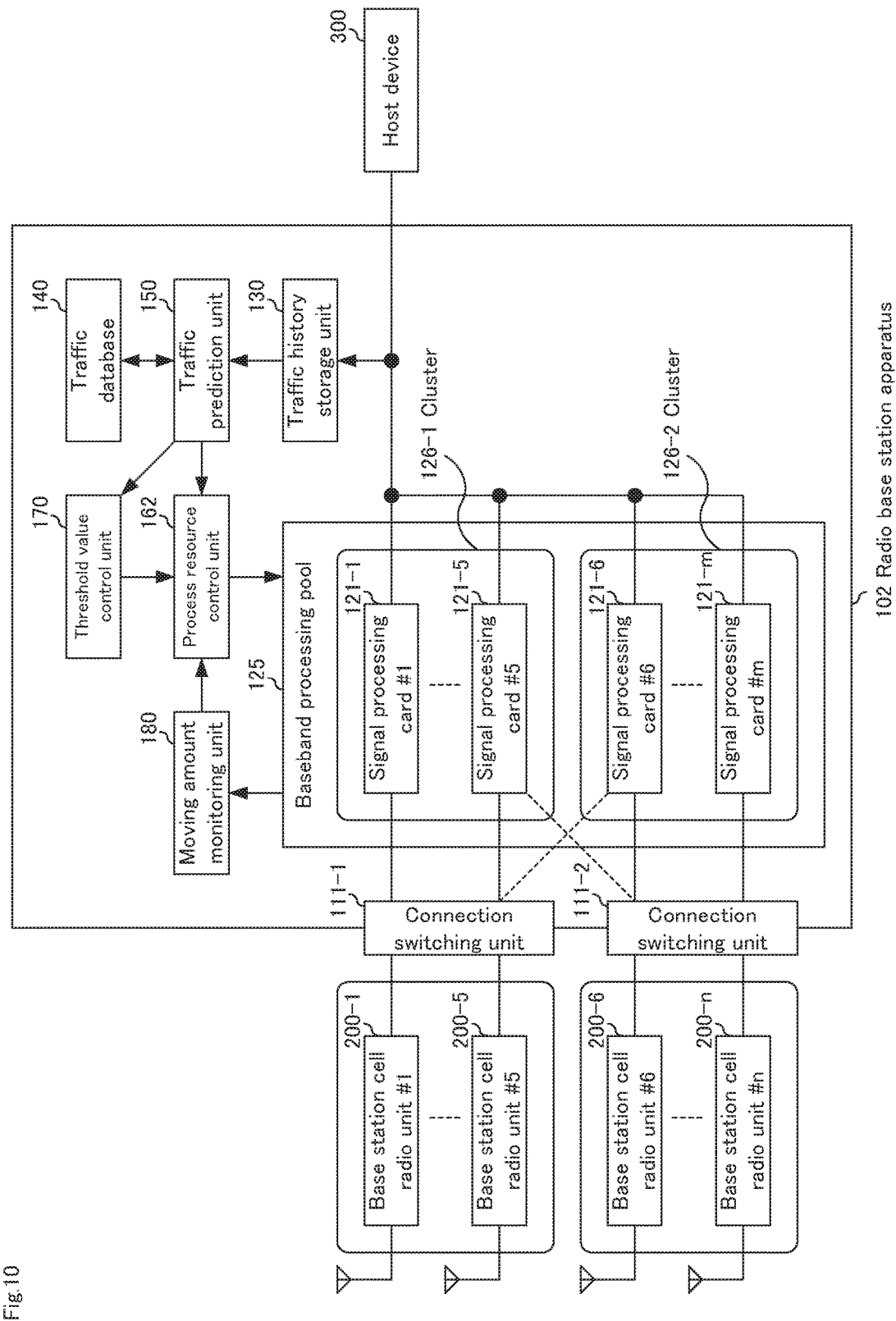
FIG. 10 is a diagram illustrating a radio base station apparatus according to the third embodiment of the present invention.

FIG. 10 is a diagram illustrating a radio base station apparatus according to the third embodiment of the present invention. In the third embodiment, process resource control is carried out by clustering signal processing cards and base station cell radio units by certain units.

As illustrated in FIG. 10, radio base station apparatus 102 according to the embodiment includes connection switching units 111-1 and 111-2, baseband processing pool 125 in which signal processing cards 121-1 to 121-m (m is integer of 2 or more) that are a plurality of signal processing modules are collected, traffic history storage unit 130, traffic database 140, traffic prediction unit 150, process resource control unit 162, threshold value control unit 170, and moving amount monitoring unit 180.

As in the case of the first embodiment, in baseband processing pool 125, by using signal processing cards 121-1 to 121-m, for example, Layer-1 processing (baseband signal processing) of a radio communication processing method such as LTE-Advanced is carried out while sharing process resources among base station cell radio units 200-1 to 200-n. The radio sides of signal processing cards 121-1 to 121-m are connected, by using an optical fiber, a radio back hole (front hole) or the like, to respective base station cell radio units 200-1 to 200-n via connection switching units 111-1 and 111-2. Here, the radio communication method implemented in baseband processing pool 125 may be radio method other than the LTE-Advanced, and a layer to be processed may be Layer-2 or the like other than Layer-1.

As a configuration that is special to the third embodiment, signal processing cards 121-1 to 121-m in baseband processing pool 125 are clustered by certain units. In the embodiment illustrated in FIG. 10, signal processing cards 121-1 to 121-5 are formed into cluster 126-1, and signal processing cards 121-6 to 121-m are formed into cluster 126-2. Similarly, base station cell radio units 200-1 to 200-n are clustered, and connected via two connection switching units 111-1 and 111-2 corresponding to clusters 126-1 and 126-2.

Hereinafter, an operation according to the embodiment illustrated in FIG. 10 will be described.

As in the case of radio base station apparatus 100 according to the first embodiment, radio base station apparatus 102 according to the present embodiment collectively executes, by using signal processing cards 121-1 to 121-m provided in baseband processing pool 125, radio communication processing such as Layer-1 processing (baseband signal processing), for example, LTE-Advanced, of base station cell radio units 200-1 to 200-n. Due to process resource sharing among signal processing cards 121-1 to 121-m, which of base station cell radio units 200-1 to 200-n is subjected to processing at which of signal processing cards 121-1 to 121-m varies. Accordingly, connection switching control with respective base station cell radio units 200-1 to 200-n is executed by connection switching units 111-1 and 111-2. Each transmitted/received signal whose connection destination has been switched by connection switching units 111-1 and 111-2 is connected to base station cell radio units 200-1 to 200-n through an optical fiber or a radio back hole (front hole).

In the third embodiment, as described above, signal processing cards 121-1 to 121-m in baseband processing pool 125 are clustered by certain units (clusters 126-1 and 126-2), and base station cell radio units 200-1 to 200-n are similarly clustered. Due to this clustering, the connection of clusters 126-1 and 126-2 is limited to a certain base station cell radio unit. Accordingly, connection switching units 111-1 and 111-2 basically switch the connection among the base station cell radio units by clusters 126-1 and 126-2.

As in the case of radio base station apparatus 100 according to the first embodiment, radio base station apparatus 102 includes, in order to execute the aforementioned process resource sharing, process resource control unit 162 configured to control process resources by using traffic fluctuation predicted by traffic prediction unit 150. As in the case of the first embodiment, traffic prediction unit 150 predicts, at predetermined fixed time interval, traffic at a next time zone (next time interval) for each of base station cell radio units 200-1 to 200-n from daily traffic data (average value) stored in traffic database 140 and the traffic history (result) of the day counted and recorded by traffic history storage unit 130. Then, process resource control unit 162 adds a threshold value (margin value) calculated by threshold value control unit 170 to the predicted traffic to carry out processing estimation for each of base station cell radio units 200-1 to 200-n, and controls process resource allocation to signal processing cards 121-1 to 121-m so as to enable efficient accommodation of its processing amount.

Further, signal processing cards 121-1 to 121-m in baseband processing pool 125 are clustered by certain units. This enables the process resource control of process resource control unit 162 to be basically carried out for each of clusters 126-1 and 126-2. For example, as illustrated in FIG. 10, signal processing cards 121-1 to 121-5 are clustered for cluster 126-1, and basically signal processing cards 121-1 to 121-5 are in charge of processing of base station cell radio units 200-1 to 200-5. Signal processing cards 121-6 to 121-m are clustered for cluster 126-2, and basically signal processing cards 121-6 to 121-m are in charge of processing of base station cell radio units 200-6 to 200-n. In this case, process resource control unit 162 basically carries out process resource control for each of clusters 126-1 and 126-2. In other words, the process resource control of signal processing cards 121-1 to 121-5 included in cluster 126-1 and the process resource control of signal processing cards 121-6 to 121-m included in cluster 126-2 are independently executed for respective clusters 126-1 and 126-2. Basically, the processing amount of the process resource control exponentially increases with respect to the number of target base station cell radio units. Thus, through clustering and division of the target base station cell radio units, the processing amount (calculation amount) of the process resource control can be reduced, and a high speed can be achieved. In addition, process resource control operations can be carried out in parallel among the clusters, and in this case a much higher speed can be achieved.

Figure 11:
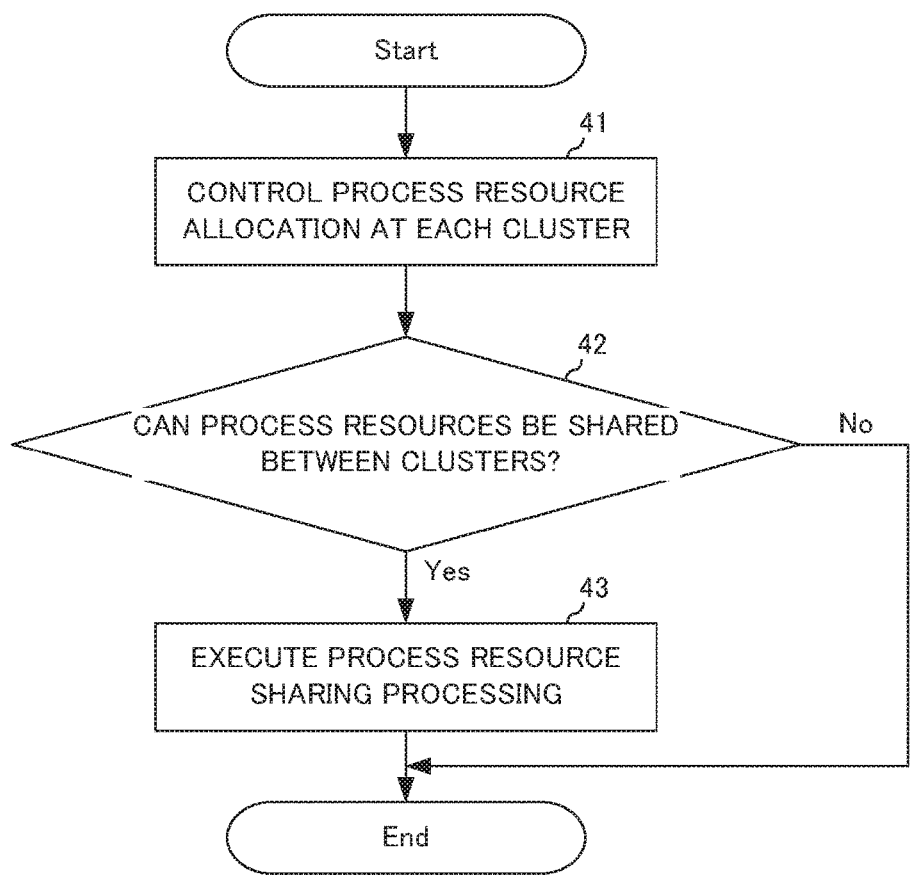
FIG. 11 is a flowchart illustrating an example of process resource control at the radio base station apparatus illustrated in FIG. 10.

FIG. 11 is a flowchart illustrating an example of the process resource control at radio base station apparatus 102 illustrated in FIG. 10.

Figure 12A:
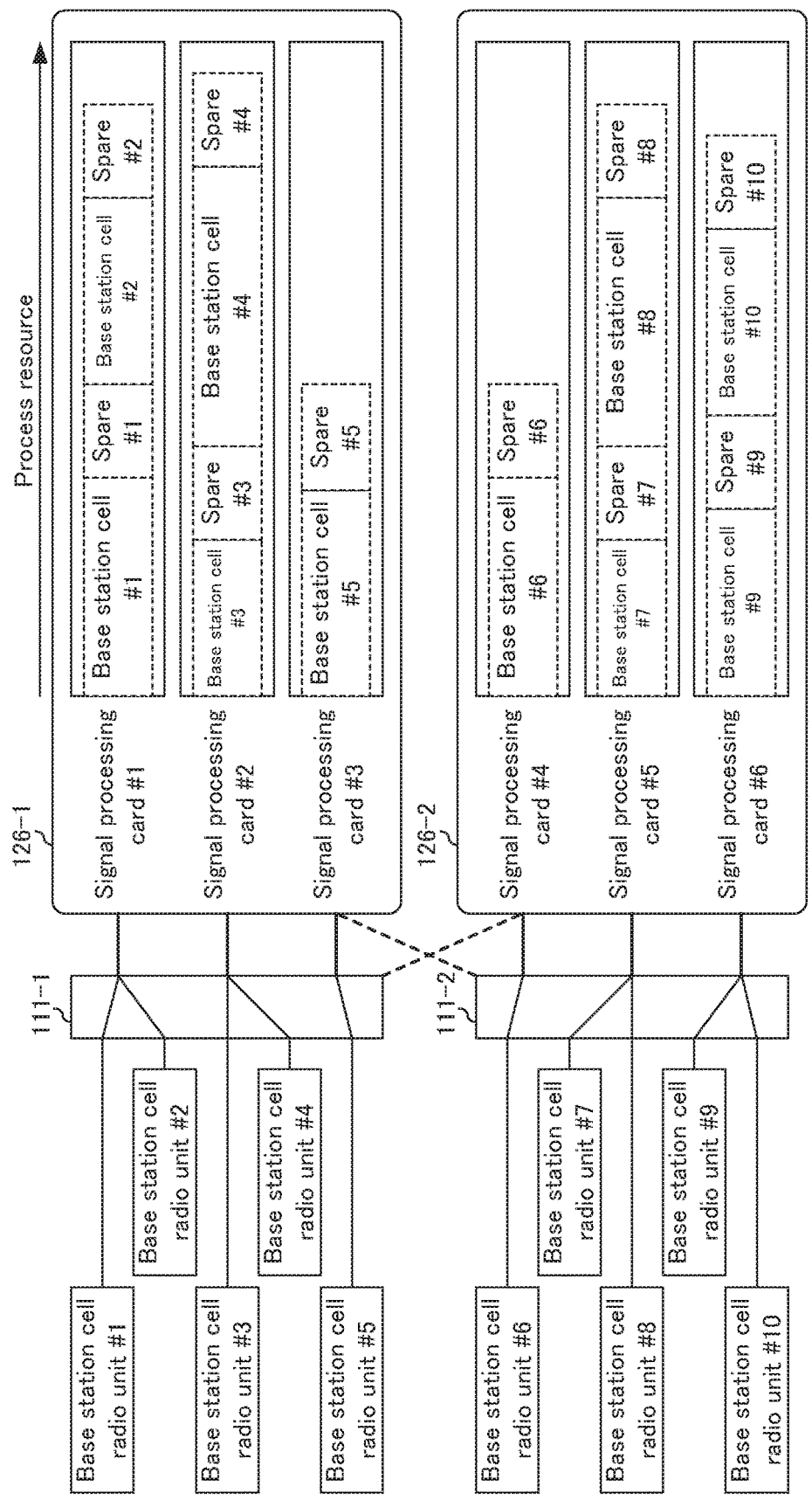
FIG. 12A is a diagram illustrating an example of a manner in which process resource control is carried out by a process resource control unit illustrated in FIG. 10.

FIGS. 12A and 12B are diagrams each illustrating an example of a manner in which the process resource control is carried out by process resource control unit 162 illustrated in FIG. 10. An example will be described where there are six signal processing cards #1 to #6 in which signal processing cards #1 to #3 are included in cluster 126-1 and are basically in charge of the processing of base station cell radio units #1 to #5, and in which signal processing cards #4 to #6 are included in cluster 126-2 and are basically in charge of the processing of base station cell radio units #6 to #10.

As illustrated in FIG. 12A, first in step 41, process resource control unit 162 carries out process resource control for each of clusters 126-1 and 126-2. Through such clustering, in place of complex process resource control processing in the configuration where there are totally six signal processing cards and whoes the number of base station cell radio units is ten, process resource control processes, in a configuration where there are three signal processing cards and whoes the number of base station cell radio units is five, are carried out in parallel (twice independently), and the calculation amount of overall process resource control can be reduced.

Further, in the case of carrying out the process resource control for each of clusters 126-1 and 126-2, process resource control unit 162 executes, when traffic decreases and when the base station cell radio units are collected, the process resource control so as to prevent process resource allocation to a signal processing card (signal processing card #3 or #4 illustrated in FIG. 12A) that is a cluster boundary.

For the processing of a base station cell radio unit that is a surplus for collection and scheduled to be allocated to the signal processing card of the cluster boundary, then, in step 42, process resource control unit 162 additionally executes the processing to determine whether or not process resource sharing is allowed between clusters 126-1 and 126-2. Accordingly, as illustrated in FIG. 12B, in step 43, the processes of base station cell radio unit #5 of which signal processing cards #1 to #3 in cluster 126-1 are in charge are collected in signal processing card #4 in cluster 126-2 through additional resource control processing between the clusters, and power can be turned off without operating signal processing card 3 in cluster 126-1.

According to the third embodiment, the circuits of connection switching units 111-1 and 111-2 can also be changed, through clustering of signal processing cards likely to be connected to each base station cell radio unit, for example, from the complete configuration of totally six cross bars to the limited configuration of four cross bars or the like, and thus the circuit sizes or the operation delays of connection switching units 111-1 and 111-2 can be reduced. In addition, through the clustering, when the base station cell radio unit is extended in the future, the changing of corresponding connection switching units 111-1 and 111-2 is unnecessary unless there is a change in the relationship between target base station cell radio units in a given cluster, and the processing can be carried out through changing or extending only the signal processing card or connection switching units 111-1 and 111-2 of only a cluster close to the extended portion.

The present invention described above by way of the first to third embodiments provides the following advantages.

The first advantage is that in the radio base station apparatus collecting the radio communication processes of the plurality of base stations, low power consumption can be achieved by reducing the number of baseband cards (signal processing cards) or the number of computing units to be operated as much as possible while reducing switching overhead caused by frequent resource switching to prevent the occurrence of instantaneous resource switching.

The reason is that in the radio base station apparatus of the present invention, by basically carrying out semistatic resource allocation control on the basis of traffic prediction at a predetermined time interval (10 minutes, 30 minutes, or 1 hour), and on the basis of predicting a fluctuation tendency from past traffic data and the traffic history of the day to execute next process resource allocation, frequent resource switching can be prevented, and processing overhead that is caused by switching can be reduced. In addition, by realizing process resource sharing according to the traffic fluctuation even while reducing the switching overhead, the number of baseband cards or the number of computing units to be operated can be reduced. This may lead to lower power consumption of the radio base station apparatus. There is also an advantage in which, since the risk of a requirement for instantaneous resource switching can be reduced by traffic prediction, the risk of a processing failure generated because switching processing is not in time can be reduced.

Further, the accuracy of the traffic database storing the daily average is indicated as a variance value by accumulating the differences between the database and the traffic results, and is added as the threshold value (margin value) of the required processing amount of each base station cell radio unit, and thus it can be reflected in the accuracy of the traffic prediction. In addition, there is an advantage that when fluctuation in traffic or threshold value (margin value) among the base station cell radio units necessitates movement of the processing of the base station cell radio units among the signal processing cards, by determining which of the base station cell radio units is subjected to processing movement by using the moving amount of each base station cell radio unit notified from each signal processing card, process resource switching can be carried out with smaller switching overhead.

The second advantage is that in the radio base station apparatus that collects the radio communication processes of the plurality of base stations, low power consumption can be achieved by carrying out process resource control by taking into account whether or not cells are CoMP target cells.

The reason is that by carrying out the process resource allocation processing of the signal processing card on the basis of information about the CoMP target cells and allocating the process resources of the base station cell radio units that are CoMP targets to the same signal processing card, transmission data processing that originally was required individually for each base station radio unit can be provided such that transmission data processing can be shared, in common, between the base station cell radio units. In other words, since a processing amount can be smaller than that when process resources are allocated to separate signal processing cards, the operation time of the computing unit in the signal processing card can be reduced to achieve lower power consumption. In addition, there is an advantage that, similar to the case of whether or not cells are carrier aggregation processing target cells, by allocating the target cells to the same signal processing card, processing that is to be shared between the base station cell radio units can be arranged to be shared in common in order to achieve a smaller processing amount and lower power consumption.

The third advantage is that in the radio base station apparatus collecting the radio communication processes of the plurality of base stations, a processing failure that accompanies the process resource allocation control can be prevented.

The reason is, for example, as described above in the second embodiment, that by providing the switching timing monitoring function, even when a sudden increase occurs in traffic volume, which can not be controlled by the traffic prediction at the predetermined time interval, process resource control can be carried out by taking into account the processing movement amount (moving time) of each of base station cell radio units during the predetermined time interval. In other words, there is an advantage in which processing overhead that accompanies switching can be reduced basically by executing the process resource switching control at the predetermined time interval, and then even the sudden increase of the traffic volume that exceeds the predicted traffic can be managed. Still when the process resource control is not in time, by providing the upper layer with the notification function of limiting the increase of the radio resource allocation of the base station cell radio units, a processing failure that accompanies the process resource allocation can be prevented.

The fourth advantage is that in the radio base station apparatus that collects the radio communication processes of the plurality of base stations, processing time and a circuit size that accompanies the process resource allocation control can be reduced.

The reason is, for example, as described above in the third embodiment, that by clustering the signal processing cards in the baseband processing pool by certain units and basically dividing the base station cell radio units for each cluster to carry out process resource control, the processing amount (calculation amount) of the process resource control can be reduced, and a high speed can be achieved. In addition, process resource control operations can be carried out in parallel among the clusters, and in this case a much higher speed can be achieved. Regarding the circuit configuration of the connection switching unit, the number of signal processing cards to be connected to each base station cell radio unit can be reduced through clustering, thus providing the advantage of reducing the circuit sizes or the operation delays.

Further, by executing process resource sharing between the clusters after the process resources have been allocated for each cluster, the signal processing card can be shared between the clusters, and thus power consumption can be further reduced. In addition, through the clustering, even if the base station cell radio unit is extended in the future, the changing of corresponding signal processing cards or connection switching units will not be necessary unless there is any change in relationship between target base station cell radio units in a given cluster, and the processing can be carried out through changing or extending of only the signal processing card or the connection switching units of only a cluster close to the extended portion. In other words, there is an advantage in which expandability can be improved through clustering.

The processing carried out by each component provided in aforementioned radio base station apparatuses 100 to 102 may be carried out by each logical circuit can be prepared to meet specific needs. A computer program (hereinafter, referred to as program) describing processing content as a procedure may be recorded in a storage medium readable by each of radio base station apparatuses 100 to 102, and the program recorded in the recording medium may be read by each of radio base station apparatuses 100 to 102 to be executed. The storage medium readable by each of radio base station apparatuses 100 to 102 is a relocatable recording medium such as a floppy (registered trademark) disk, a magneto-optical disk, a DVD, or a CD, or a memory such as a ROM or a RAM, or a HDD included in each of radio base station apparatuses 100 to 102. The program recorded in the recording medium is read by a CPU (not illustrated) provided in each of radio base station apparatuses 100 to 102, and processing similar to that described above is carried out under control of the CPU. Here, the CPU operates as a computer for executing the program read from the recording medium in which the program has been recorded.

Some or all of the aforementioned embodiments may be, as described, but they are not limited, in the following appendixes.

(Appendix 1)

A radio base station apparatus that collects radio signal processes carried out at a plurality of base station cell radio units, comprising:

a baseband processing pool that collects a plurality of signal processing modules for carrying out the radio signal processes;

a traffic history storage unit that stores traffic results at the plurality of base station cell radio units as traffic history;

a traffic database that stores traffic data learned on the basis of the traffic history that indicates the traffic results;

a traffic prediction unit that predicts, on the basis of the traffic data and the traffic history, traffic fluctuation after a predetermined time; and a process resource control unit that controls, on the basis of the predicted traffic fluctuation, the allocation of process resources in the signal processing modules at every predetermined time interval.

(Appendix 2)

The radio base station apparatus according to appendix 1, wherein the traffic database stores the traffic data of each predetermined time.

(Appendix 3)

The radio base station apparatus according to appendix 1 or 2, wherein the traffic database stores traffic data according to position information and date information of the plurality of base station cell radio units.

(Appendix 4)

The radio base station apparatus according to any one of appendixes 1 to 3, further comprising a threshold value control unit that calculates the margin value of a process resource amount necessary for each of the base station cell radio units, wherein:

the traffic prediction unit calculates a variance value by accumulating differences between the traffic data and the traffic history;

the threshold value control unit calculates the margin value on the basis of the variance value; and the process resource control unit also uses the margin value for process resource allocation control.

(Appendix 5)

The radio base station apparatus according to any one of appendixes 1 to 4, further comprising a cooperation target cell information acquisition unit that acquires, from a host device, Coordinated Multi-Point Transmission and Reception target cell information indicating whether or not the plurality of base station cell radio units is a Coordinated Multi-Point Transmission and Reception processing target cell, wherein the process resource control unit also uses the Coordinated Multi-Point Transmission and Reception target cell information for process resource allocation control.

(Appendix 6)

The radio base station apparatus according to any one of appendixes 1 to 5, further comprising a moving amount monitoring unit that records a moving amount or moving time, which is a processing load amount for moving radio signal processing of the plurality of base station cell radio units from a signal processing module currently engaged in the radio signal processing to another signal processing module, wherein the process resource control unit also uses the moving amount or the moving time for process resource allocation control.

(Appendix 7)

The radio base station apparatus according to appendix 6, further comprising a switching timing monitoring unit that predicts, by using the moving amount or the moving time recorded by the moving amount monitoring unit, traffic at timing when the moving time of the process resources is in time to satisfy each time at which process resource allocation control is executed, and controls the switching timing of the process resources on the bases of the predicted traffic, wherein the process resource control unit executes the process resource allocation control at the timing controlled by the switching timing monitoring unit.

(Appendix 8)

The radio base station apparatus according to any one of appendixes 1 to 7, wherein:

in the baseband processing pool, the signal processing modules are clustered by certain units; and the process resource control unit executes the process resource allocation control for each of the clusters.

(Appendix 9)

The radio base station apparatus according to appendix 8, wherein the process resource control unit determines, after the execution of the process resource allocation control for each of the clusters, whether or not process resource sharing is allowed between the clusters, and executes process resource allocation control between the clusters on the basis of the result of the determination.

(Appendix 10)

A resource allocation method in an apparatus for collecting radio signal processes carried out at a plurality of base station cell radio units, comprising:

processing for storing traffic results at the plurality of base station cell radio units as traffic history;

processing for storing traffic data learned on the basis of the traffic history that indicates the traffic results;

processing for predicting, on the basis of the traffic data and the traffic history, traffic fluctuation after a predetermined time; and processing for controlling, on the basis of the predicted traffic fluctuation, the allocation of process resources in a plurality of signal processing modules for carrying out the radio signal processes at every predetermined time interval.

(Appendix 11)

The radio base station apparatus according to appendix 8 or 9, further comprising a connection switching unit that connects only the corresponding processing module for each base station cell on the premise of the configuration of the clusters.

The present invention has been described with reference to the embodiments. However, the present invention is not limited to the aforementioned embodiments. Various changes understandable to those skilled in the art can be made to the configuration and the specifics of the present invention within the scope of the invention.

This application claims priority from Japanese Patent Application No. 2013-199439 filed on Sep. 26, 2013, which is hereby incorporated by reference herein in its entirety.

The invention claimed is:

1. A radio base station apparatus that collects radio signal processes carried out at a plurality of base station cell radio units, the apparatus comprising:
   a CPU;
   a baseband processing pool, including a plurality of signal processors, for carrying out the radio signal processes; and
   a memory in communication with the CPU, the memory having program code stored therein that, upon execution by the CPU, controls operation of the apparatus, the program code including:
      code that causes the apparatus to operate as a traffic history storage unit that stores traffic results at the plurality of base station cell radio units as traffic history;
      code that causes the apparatus to maintain a traffic database that stores traffic data learned on the basis of the traffic history that indicates the traffic results;
      code that causes the apparatus to operate as a traffic prediction unit that predicts, on the basis of the traffic data and the traffic history, traffic fluctuation after a predetermined time;
      code that causes the apparatus to operate as a process resource control unit that controls, on the basis of the predicted traffic fluctuation, allocation of process resources in the signal processors at every predetermined time interval; and
      code that causes the apparatus to operate as a threshold value control unit that calculates a margin value of a process resource amount necessary for each of the base station cell radio units,
   wherein the traffic prediction unit calculates a variance value by accumulating differences between the traffic data and the traffic history,
   wherein the threshold value control unit calculates the margin value on the basis of the variance value, and
   wherein the process resource control unit also uses the margin value for the process resource allocation control.

2. The radio base station apparatus according to claim 1, wherein the traffic database stores traffic data of each predetermined time.

3. The radio base station apparatus according to claim 1, wherein the traffic database stores traffic data according to position information and date information of the plurality of base station cell radio units.

4. The radio base station apparatus according to claim 1, wherein the program code also includes code that causes the apparatus to operate as a cooperation target cell information acquisition unit that acquires, from a host device, Coordinated Multi-Point Transmission and Reception target cell information indicating whether or not the plurality of base station cell radio units is a Coordinated Multi-Point Transmission and Reception processing target cell,
   wherein the process resource control unit also uses the Coordinated Multi-Point Transmission and Reception target cell information for the process resource allocation control.

5. The radio base station apparatus according to claim 1, wherein the program code also includes code that causes the apparatus to operate as a moving amount monitoring unit that records a moving amount or moving time, which is a processing load amount for moving radio signal processing of the plurality of base station cell radio units from a signal processor of the signal processors currently engaged in the radio signal processing to another signal processor of the signal processors,
   wherein the process resource control unit also uses the moving amount or the moving time for the process resource allocation control.

6. The radio base station apparatus according to claim 5, wherein the program code also includes code that causes the apparatus to operate as a switching timing monitoring unit that predicts, by using the moving amount or the moving time recorded by the moving amount monitoring unit, traffic at a timing when moving time of the process resources is in time to satisfy each time at which process resource allocation control is executed, and control switching timing of the process resources on the bases of the predicted traffic,
   wherein the process resource control unit executes the process resource allocation control at the timing controlled by the switching timing monitoring unit.

7. The radio base station apparatus according to claim 1, wherein:
   in the baseband processing pool, the signal processors are clustered by certain units; and
   the process resource control unit executes the process resource allocation control for each of the clusters.

8. The radio base station apparatus according to claim 7, wherein the process resource control unit determines, after the execution of the process resource allocation control for each of the clusters, whether or not process resource sharing is allowed between the clusters, and executes process resource allocation control between the clusters on the basis of a result of the determination.

9. A resource allocation method in an apparatus for collecting radio signal processes carried out at a plurality of base station cell radio units, comprising:
   storing traffic results at the plurality of base station cell radio units as traffic history;
   storing traffic data learned on the basis of the traffic history that indicates the traffic results;
   predicting, on the basis of the traffic data and the traffic history, traffic fluctuation after a predetermined time;
   controlling, on the basis of the predicted traffic fluctuation, allocation of process resources in a plurality of signal processors for carrying out the radio signal processes at every predetermined time interval; and
   calculating a margin value of a process resource amount necessary for each of the base station cell radio units,
   wherein a variance value is calculated by accumulating differences between the traffic data and the traffic history,
   wherein the margin value is calculated on the basis of the variance value, and wherein the allocation of process resources is further controlled using the margin value.

10. The radio base station apparatus according to claim 2, wherein the traffic database stores traffic data according to position information and date information of the plurality of base station cell radio units.

11. The radio base station apparatus according to claim 2, wherein the program code also includes code that causes the apparatus to operate as a cooperation target cell information acquisition unit that acquires, from a host device, Coordinated Multi-Point Transmission and Reception target cell information indicating whether or not the plurality of base station cell radio units is a Coordinated Multi-Point Transmission and Reception processing target cell, wherein the process resource control unit also uses the Coordinated Multi-Point Transmission and Reception target cell information for the process resource allocation control.

12. The radio base station apparatus according to claim 3, wherein the program code also includes code that causes the apparatus to operate as a cooperation target cell information acquisition unit that acquires, from a host device, Coordinated Multi-Point Transmission and Reception target cell information indicating whether or not the plurality of base station cell radio units is a Coordinated Multi-Point Transmission and Reception processing target cell, wherein the process resource control unit also uses the Coordinated Multi-Point Transmission and Reception target cell information for the process resource allocation control.

13. The radio base station apparatus according to claim 2, wherein the program code also includes code that causes the apparatus to operate as a moving amount monitoring unit that records a moving amount or moving time, which is a processing load amount for moving radio signal processing of the plurality of base station cell radio units from a signal processor of the signal processors currently engaged in the radio signal processing to another signal processor of the signal processors, wherein the process resource control unit also uses the moving amount or the moving time for the process resource allocation control.

14. The radio base station apparatus according to claim 3, wherein the program code also includes code that causes the apparatus to operate as a moving amount monitoring unit that records a moving amount or moving time, which is a processing load amount for moving radio signal processing of the plurality of base station cell radio units from a signal processor of the signal processors currently engaged in the radio signal processing to another signal processor of the signal processors, wherein the process resource control unit also uses the moving amount or the moving time for the process resource allocation control.

15. The radio base station apparatus according to claim 4, wherein the program code also includes code that causes the apparatus to operate as a moving amount monitoring unit that records a moving amount or moving time, which is a processing load amount for moving radio signal processing of the plurality of base station cell radio units from a signal processor of the signal processors currently engaged in the radio signal processing to another signal processor of the signal processors, wherein the process resource control unit also uses the moving amount or the moving time for the process resource allocation control.

* * * * *